(12) United States Patent
Nihei et al.

(10) Patent No.: US 7,834,902 B2
(45) Date of Patent: Nov. 16, 2010

(54) PIXEL CLOCK CREATION METHOD, PIXEL CLOCK CREATION DEVICE, OPTICAL SCANNING DEVICE, AND IMAGE FORMING APPARATUS

(75) Inventors: Yasuhiro Nihei, Kanagawa (JP); Masaaki Ishida, Kanagawa (JP); Atsufumi Omori, Kanagawa (JP); Dan Ozasa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 698 days.

(21) Appl. No.: 11/741,871

(22) Filed: Apr. 30, 2007

(65) Prior Publication Data

US 2007/0285495 A1    Dec. 13, 2007

Related U.S. Application Data

(62) Division of application No. 10/953,372, filed on Sep. 30, 2004, now Pat. No. 7,212,224.

(30) Foreign Application Priority Data

Oct. 2, 2003    (JP)    ............... 2003-343946

(51) Int. Cl.
    B41J 2/435    (2006.01)
(52) U.S. Cl. ..................................... 347/249
(58) Field of Classification Search ................ 347/229, 347/234–236, 248–250
    See application file for complete search history.

(56) References Cited

U.S. PATENT DOCUMENTS

| | | | |
|---|---|---|---|
| 4,694,156 A | 9/1987 | Swanberg | |
| 5,138,623 A | 8/1992 | Ema et al. | |
| 5,212,570 A | 5/1993 | Nacman | |
| 5,237,579 A | 8/1993 | Ema et al. | |
| 5,258,780 A | 11/1993 | Ema et al. | |
| 5,671,069 A | 9/1997 | Kodama | |
| 5,784,091 A | 7/1998 | Ema et al. | |
| 5,946,334 A | 8/1999 | Ema et al. | |
| 6,118,798 A | 9/2000 | Ema et al. | |
| 6,172,788 B1 * | 1/2001 | Suzuki et al. ............ | 359/204.1 |
| 6,353,455 B1 * | 3/2002 | Ozaki et al. ................. | 347/236 |

(Continued)

FOREIGN PATENT DOCUMENTS

JP    61-160418    10/1986

(Continued)

OTHER PUBLICATIONS

U.S. Appl. No. 12/029,115, filed Feb. 11, 2008, Omori, et al.

*Primary Examiner*—Hai C Pham
(74) *Attorney, Agent, or Firm*—Oblon, Spivak, McClelland, Maier & Neustadt, L.L.P.

(57) ABSTRACT

In a pixel clock creation method and device, a high frequency clock is created. A scanning time needed to scan a predetermined scanning length is detected in accuracy of half a period of the high frequency clock to output a detection value indicating the detected scanning time. The detection value and a predetermined target value are compared to output a comparison result. A phase data is created based on the comparison result. A pixel clock whose phase is controlled based on both the high frequency clock and the phase data is created.

12 Claims, 42 Drawing Sheets

U.S. PATENT DOCUMENTS

| | | |
|---|---|---|
| 6,498,617 B1 | 12/2002 | Ishida et al. |
| 6,650,352 B2 * | 11/2003 | Pawley et al. ............... 347/234 |
| 6,731,317 B2 | 5/2004 | Ema et al. |
| 6,791,596 B2 | 9/2004 | Nihei et al. |
| 6,927,789 B2 * | 8/2005 | Ozasa et al. ............... 347/249 |
| 6,940,536 B2 | 9/2005 | Rauch et al. |
| 2003/0035451 A1 | 2/2003 | Ishida et al. |
| 2003/0067533 A1 | 4/2003 | Omori et al. |
| 2003/0156184 A1 | 8/2003 | Suzuki et al. |
| 2004/0032482 A1 | 2/2004 | Ozasa et al. |
| 2004/0036762 A1 | 2/2004 | Nihei et al. |
| 2004/0125199 A1 | 7/2004 | Omori et al. |

FOREIGN PATENT DOCUMENTS

| | | |
|---|---|---|
| JP | 63-61963 | 3/1988 |
| JP | 11-167081 | 6/1999 |
| JP | 2001-228415 | 8/2001 |

* cited by examiner

FIG.8

| CONTROL DATA1 CONTROL DATA2 | CONTROL SIGNAL-1b | CONTROL SIGNAL-2b |
|---|---|---|
| 000 | S18 | S28 |
| 001 | S17 | S27 |
| 010 | S16 | S26 |
| 011 | S15 | S25 |
| 100 | S14 | S24 |

FIG.9

| PHASE SHIFT | PHASE DATA 3 bits |
|---|---|
| 0 | 000 |
| 1/16PCLK ADVANCE | 001 |
| 2/16PCLK ADVANCE | 010 |
| 3/16PCLK ADVANCE | 011 |
| 1/16PCLK DELAY | 111 |
| 2/16PCLK DELAY | 110 |
| 3/16PCLK DELAY | 101 |

FIG.10

| PHASE DATA 3 bits | STATUS SIGNAL | CONTROL DATA1 | CONTROL DATA2 |
|---|---|---|---|
| 000 | 0 | 010 | 010 |
| 000 | 1 | 010 | 010 |
| 001 | 0 | 010 | 001 |
| 001 | 1 | 001 | 010 |
| 010 | 0 | 001 | 001 |
| 010 | 1 | 001 | 001 |
| 011 | 0 | 001 | 000 |
| 011 | 1 | 000 | 001 |
| 111 | 0 | 011 | 010 |
| 111 | 1 | 010 | 011 |
| 110 | 0 | 011 | 011 |
| 110 | 1 | 011 | 011 |
| 101 | 0 | 100 | 011 |
| 101 | 1 | 011 | 100 |

PIXEL CLOCK CREATION METHOD, PIXEL CLOCK CREATION DEVICE, OPTICAL SCANNING DEVICE, AND IMAGE FORMING APPARATUS

CROSS-REFERENCE TO RELATED APPLICATIONS

The present application is a division of U.S. application Ser. No. 10/953,372, filed Sep. 30, 2004, which claims the benefit of priority under 35 U.S.C. §119 from Japan Application No. 2003-343946, filed Oct. 2, 2003, the entire contents of each of which is hereby incorporated by reference.

BACKGROUND OF THE INVENTION

1. Field of the Invention

The present invention generally relates to pixel clock creation and phase control widely used in image forming apparatuses including laser printers and digital copiers. More particularly, the present invention relates to a pixel clock creation method and device which realize highly precise phase control of the pixel clock, an optical scanning device and an image forming apparatus equipped with the pixel clock creation device.

2. Description of the Related Art

FIG. 43 shows the composition of the image forming apparatus, such as laser printer, digital copier etc.

As shown in FIG. 43, the scanning of the laser light which is emitted from the semiconductor laser 501 is carried out by the polygon mirror 502 which is rotated. The laser light from the polygon mirror 502 is focused through the scanning lens 503 and forms the optical spot on the photoconductor 504 which is the scanned medium. The photoconductor 504 is exposed to the laser light so that the electrostatic latent image is formed.

At this time, the photodetection unit 505 detects the scanning light for every scanning line, and the phase lock circuit 509 creates the image clock (pixel clock) with the phase synchronized for every scanning line, based on the clock of the clock creation circuit 508 and the output signal of the photodetector 505. The phase lock circuit 509 supplies the pixel clock to each of the image-processing unit 506 and the laser drive circuit 507.

The image-processing unit 506 creates the image data on the basis of the pixel clock supplied from the phase lock circuit 509, and outputs the image data to the laser drive circuit 507.

The laser drive circuit 507 controls the emission time of the semiconductor laser 501 in accordance with the image clock with the phase locked by the phase lock circuit 509 for every scanning line and in accordance with the image data created by the image-processing unit 506.

In the above-mentioned scanning optical system, the variations of the distance from the rotation axis of the deflection reflection surface of the deflector, such as the polygon scanner may occur, and the variations may cause the irregularities of the scanning speed of the optical spot (the scanning beam) which optically scans the surface of the photoconductor.

The scanning-speed irregularities may cause fluctuations of the reproduced image, and the image quality will be degraded. Thus, if a high-quality image is demanded, it is necessary to correct such scanning irregularities.

Furthermore, in the case of the multi-beam optical system, when there is a difference in the oscillation wavelength of each of the light sources and the chromatic aberration of the scanning lens is not corrected in the optical system, the deviation of the exposure position occurs. The difference of the scanning width arises for each of the light sources when the spot corresponding to each source of luminescence scans the surface of the scanned medium, and such difference may cause the degradation of image quality. To avoid this, it is necessary to correct the scanning width.

The conventional technology for correcting the scanning irregularities is, for example, the method of changing the frequency of the image clock based on the predetermined characteristics of the scanning optical system, so that the optical spot position along the scanning line is controlled (for example, see Japanese Laid-Open Patent Application No. 11-167081 and Japanese Laid-Open Patent Application No. 2001-228415).

Moreover, by detecting the first horizontal sync signal and the second horizontal sync signal corresponding to the starting point terminal point, and carrying out calculation of the number of the clocks for every line, with two photodetectors installed in the both ends of the photoconductor as other technology, it asks for scanning speed and the method of controlling the rotational speed of the polygon mirror by the motor is learned.

It becomes complicated constituting of the image clock control unit the conventional technology (this being called frequency modulation method) of changing the frequency of the image clock.

Moreover, this complexity increases as frequency modulation width becomes minute.

For this reason, there is the problem that fine control cannot be performed, by the conventional frequency modulation method.

Moreover, by the method of controlling the rotary motor of the deflector like the polygon mirror, the limit is in the control accuracy. That is, as a factor which generates scanning irregularities, the rotation jitter of the deflector, expansion and contraction of the scanning lens by temperature change, etc. exist.

Therefore, even if it is the optical beam deflected by the same deviation reflection surface, it is difficult to cancel scanning irregularities, and by the method of controlling the rotary motor of the deflector, the limit is in the control accuracy.

SUMMARY OF THE INVENTION

An object of the present invention is to provide an improved pixel clock creation method and device in which the above-described problems are eliminated.

Another object of the present invention is to provide a pixel clock creation method which allows phase control of the pixel clock to be carried out with high precision and simple composition, so that fluctuation of the scanning width can be corrected with high precision.

Another object of the present invention is to provide a pixel clock creation device which allows phase control of the pixel clock to be carried out with high precision and simple composition, so that fluctuation of the scanning width can be corrected with high precision.

The above-mentioned objects of the present invention are achieved by a pixel clock creation device comprising: a high frequency clock creation unit creating a high frequency clock; a detection unit detecting a scanning time needed to scan a predetermined scanning length, in accuracy of half a period of the high frequency clock, and outputting a detection value indicating the detected scanning time; a comparison result creation unit comparing the detection value and a predetermined target value, and outputting a comparison result; a phase data creation unit creating a phase data based on the comparison result; and a pixel clock creation unit creating a pixel clock whose phase is controlled based on both the high frequency clock and the phase data.

The above-mentioned objects of the present invention are achieved by a pixel clock creation device comprising: a high frequency clock creation unit creating a high frequency clock; a pixel clock creation unit creating a pixel clock based on the high frequency clock, a first horizontal sync signal and a phase data, the phase data indicating a timing of transition of the pixel clock; a first reference signal creation unit creating a first reference signal based on the high-frequency clock, the pixel clock and the first horizontal sync signal; a difference detection unit creating a second reference signal and a difference data based on the high-frequency clock, the pixel clock and a second horizontal sync signal, the difference data indicating a difference between the timing of transition of the pixel clock and a timing of transition of the second horizontal sync signal; a scanning interval data creation unit creating a scanning interval data based on the pixel clock, the first reference signal, the second reference signal and the difference data, the scanning interval data indicating a scanning interval related to the first horizontal sync signal and the second horizontal sync signal; and a phase data creation unit comparing the scanning interval data and a predetermined target value to output a comparison result, and creating the phase data based on the comparison result.

The above-mentioned objects of the present invention are achieved by a pixel clock creation method comprising the steps of: creating a high frequency clock; detecting a scanning time needed to scan a predetermined scanning length, in accuracy of half a period of the high frequency clock to output a detection value indicating the detected scanning time; comparing the detection value and a predetermined target value to output a comparison result; creating a phase data based on the comparison result; and creating a pixel clock whose phase is controlled based on both the high frequency clock and the phase data.

According to the present invention, the phase control of the pixel clock can be made possible with high precision with simple composition, and it is possible to provide the pixel clock creation device which can correct the fluctuation of the scanning width with high precision.

Moreover, it is possible to provide the highly precise optical scanning device by incorporating the pixel clock creation device of the invention therein, and it is possible to provide the highly precise image forming apparatus in which the optical scanning device is provided.

BRIEF DESCRIPTION OF THE DRAWINGS

Other objects, features and advantages of the present invention will be apparent from the following detailed description when reading in conjunction with the accompanying drawings.

FIG. 8 is a diagram for explaining the truth table of the multiplexer in FIG. 7.

FIG. 9 is a diagram for explaining the correspondence between the amount of phase shift and the phase data.

FIG. 10 is a diagram for explaining the truth table of the control data creation circuit in FIG. 4.

DETAILED DESCRIPTION OF PREFERRED EMBODIMENTS

A description will now be given of the preferred embodiments of the invention with reference to the accompanying drawings.

Figure 1:
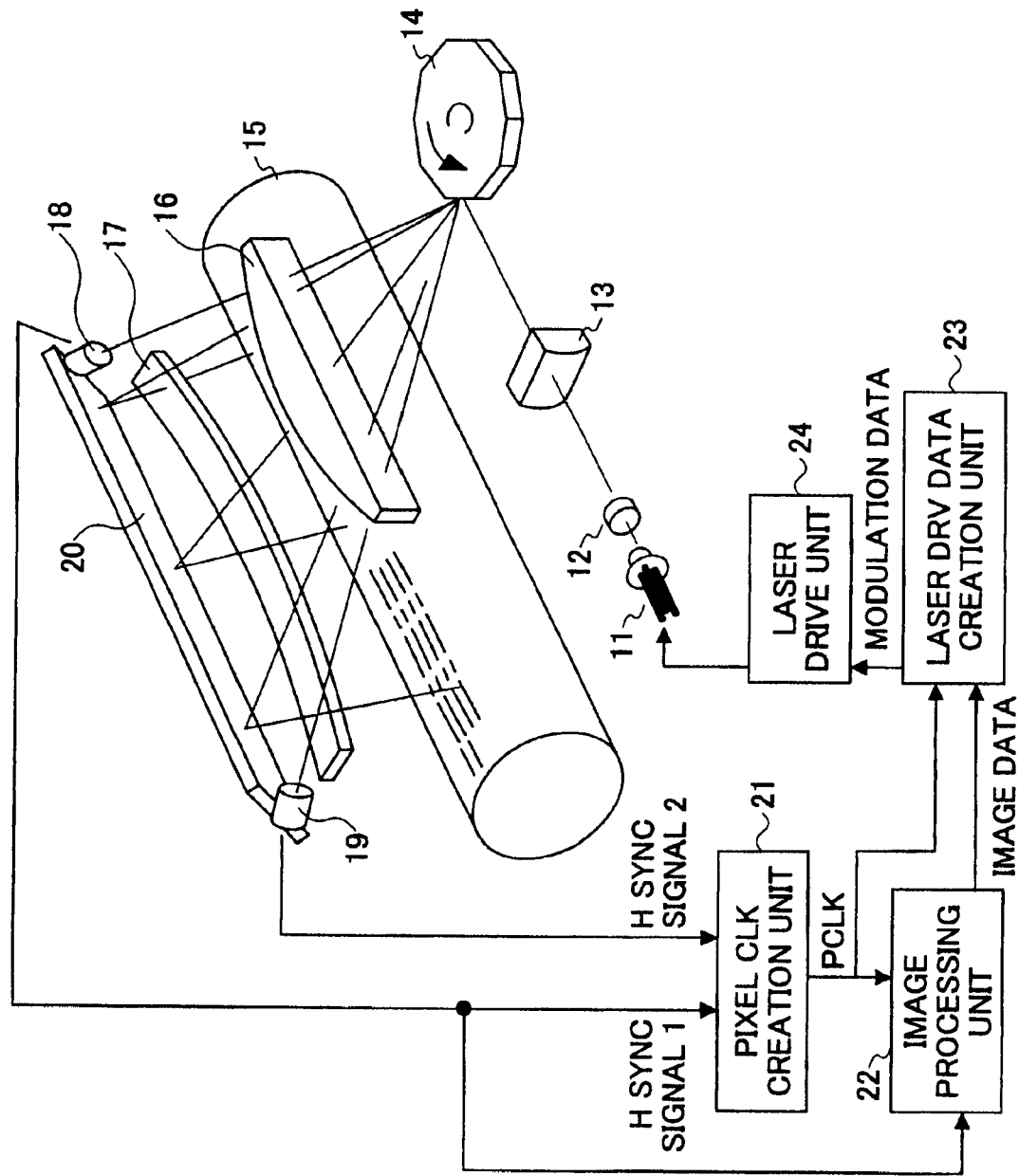
FIG. 1 is a diagram showing the composition of an image forming apparatus in which the pixel block creation device of the invention is embodied.

FIG. 1 shows the outline composition of the The whole 1 preferred-embodiment block diagram of the image forming apparatus which carried the pixel clock creation device of the present invention in FIG. 1 is shown.

The laser light from the semiconductor laser 11 passes along the collimator lens 12 and the cylinder lens 13, and the scanning is carried out by the polygon mirror 14.

The laser light from the polygon mirror 14 passes along the ftheta lens 16, and it reflects by the one-way mirror 20 (the part is penetrated), and it passes along the toroidal lens 17, and it carries out incidence to the photoconductor 15.

Thereby, the image (electrostatic latent image) is formed on the scanned surface of the photoconductor 15.

The photodetector A18 and the photodetector B19 which have been arranged on the detected field which has time correlation nature the scan-layered top detect the horizontal sync signals 1 and 2 corresponding to the starting point of the penetration light of the one-way mirror 20 of this scanning laser light, and the terminal point, and they are inputted into the pixel clock creation device 21.

With the pixel clock creation device 21, the time when laser light is scanned in between the photodetector A18 and the photodetector B19 is measured, the amount of deviations is calculated as compared with standard time (target value), the phase data which corrects the amount of deviations is created, the pixel clock is created with the phase data, and the image processing apparatus 22 and the laser drive data creation device 23 are given.

In addition, the horizontal sync signal1 which is the output of the photodetector A18 is also given to the image processing apparatus 22 as a line sync signal.

The image processing apparatus 22 creates the image data on the basis of the pixel clock given from the level clock creation device 21.

The laser drive data creation device 23 inputs this image data, creates laser drive data (abnormal-conditions data) on the basis of the pixel clock similarly given from the pixel clock creation device 21, and drives the semiconductor laser 11 through the laser driving device 24.

Thus, the image without scan-width fluctuation can be formed in the photoconductor 15.

In the following, the preferred embodiment of the pixel clock creation device 21, i.e., the pixel clock creation device of the present invention, will be explained. Moreover, some embodiments of the optical scanning device and the image forming apparatus in which the pixel clock creation device of the invention is provided will also be explained.

A description will be given of the first preferred embodiment of the invention.

Figure 2:
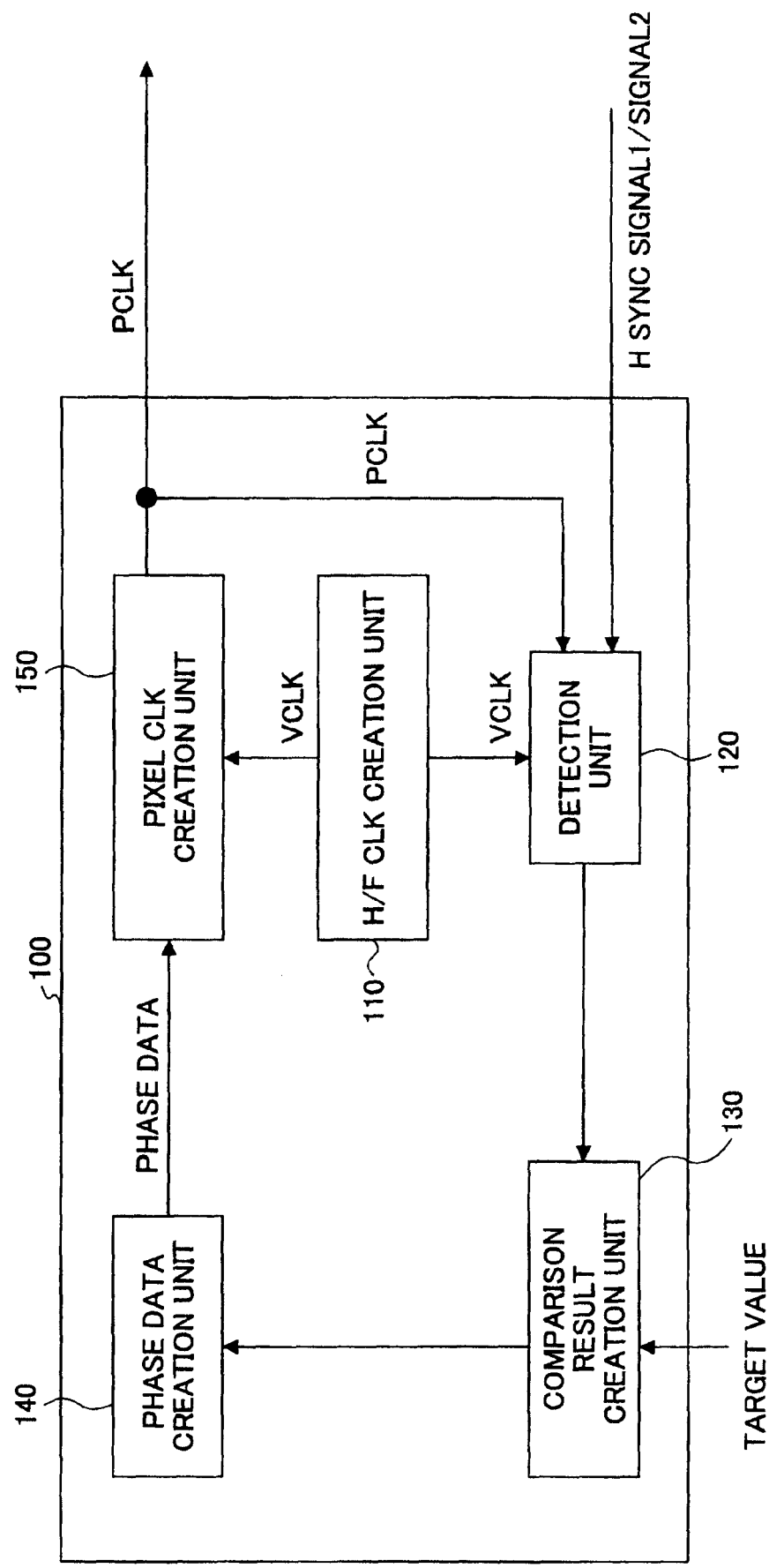
FIG. 2 is a block diagram of the composition of the pixel clock creation device in the first preferred embodiment of the invention.

FIG. 2 shows the first whole embodiment block diagram of the pixel clock creation device in the present invention.

The pixel clock creation device 100 comprises the high frequency clock creation circuit 110, the detection unit 120, the comparison result creation circuit 130, the phase data creation circuit 140, and the pixel clock creation circuit 150 in FIG. 2.

The high frequency clock creation circuit 110 creates the high frequency clock VCLK used as the base of the pixel clock PCLK. In the present embodiment, the frequency of the high frequency clock VCLK is about 1 GHz, which is faster than the frequency of in the conventional normal source clock which is in the range of 700 MHz to 800 MHz.

However, the high frequency clock VCLK according to the invention is not limited to this embodiment, and it may have an arbitrary frequency that is higher than the frequency of the pixel clock PCLK.

The detection unit 120 is the accuracy of the semicircle term of the high frequency clock VCLK, and comprises the counter which detects the interval (scanning time) after the first horizontal sync signal1 is inputted until the second horizontal sync signal2 is inputted.

The comparison result creation circuit 130 creates the difference of the count value and predetermined target value which were outputted from the detection unit 120.

The phase data creation circuit 140 creates phase data based on the comparison result outputted from the comparison result output circuit 130.

The pixel clock creation circuit 150 creates the pixel clock PCLK by which phase control was carried out based on this phase data and the high frequency clock VCLK.

Figure 3:
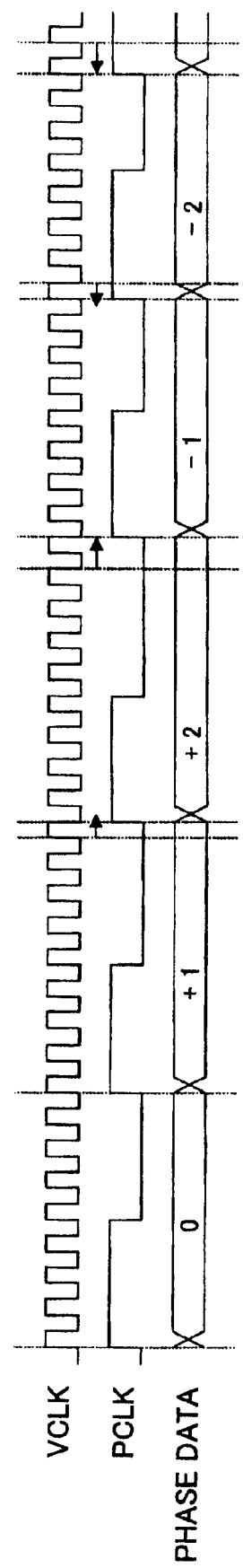
FIG. 3 is a conceptual diagram for explaining the output image of the pixel clock.

FIG. 3 is a diagram for explaining the output image of the pixel clock PCLK.

As shown in FIG. 3, when the amount of phase shifts of phase data is 0, the pixel clock PCLK shows the case where it becomes 8 dividing of the high frequency clock VCLK.

It is made for the period of the pixel clock PCLK to change by giving phase data for every clock of the pixel clock PCLK according to the amount of phase shifts of phase data at ½ clock steps of the high frequency clock VCLK, as shown in FIG. 3.

Figure 4:
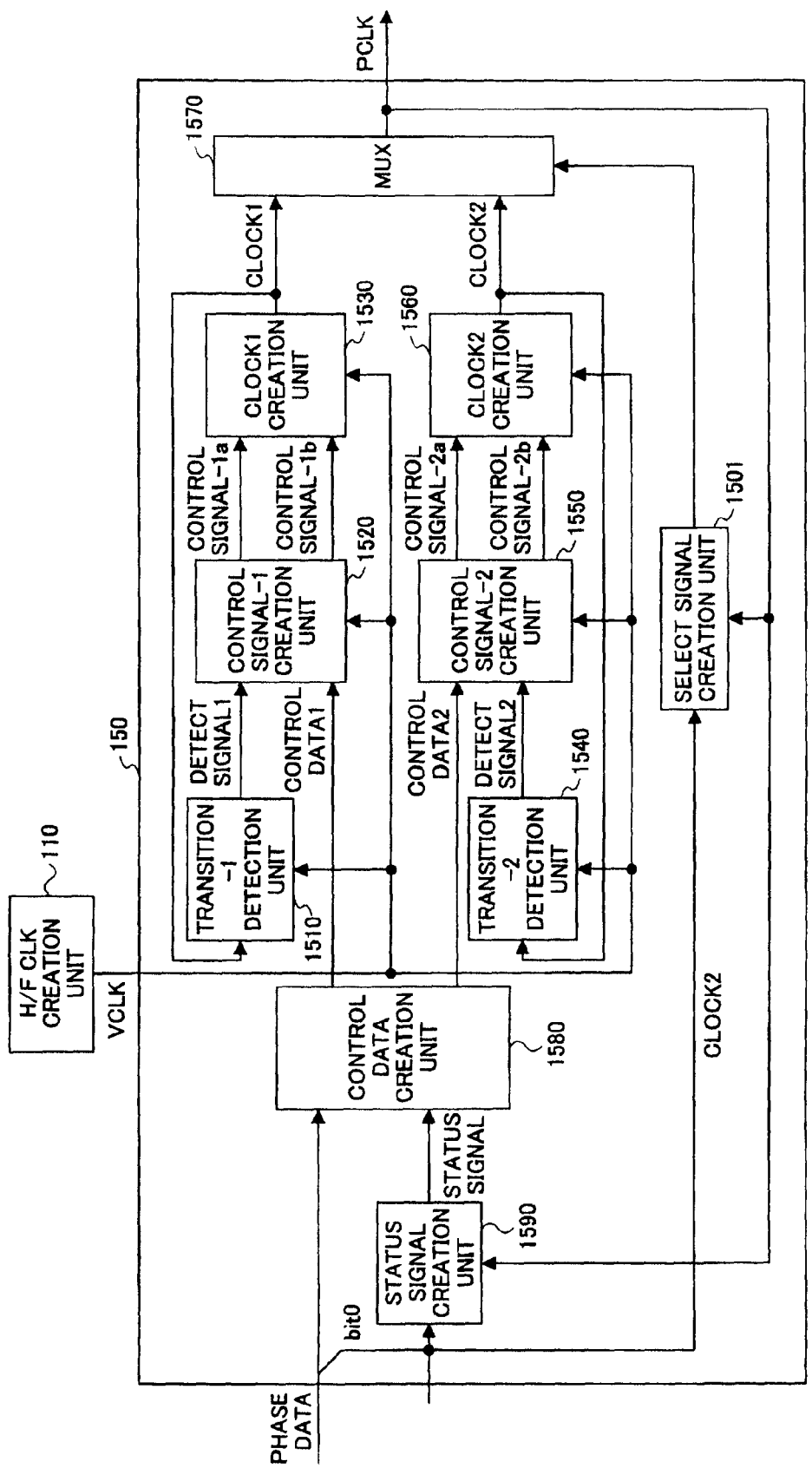
FIG. 4 is a block diagram of an embodiment of the pixel clock creation circuit in FIG. 2.

FIG. 4 is a block diagram of an embodiment of the pixel clock creation circuit 150 in FIG. 2.

The pixel clock creation circuit 150 comprises the transition-1 detection unit 1510, the control signal-1 creation unit 1520, the clock 1 creation circuit 1530, the transition-2 detection unit 1540, the control signal-2 creation unit 1550, the clock 2 creation circuit 1560, the multiplexer 1570, the control data creation circuit 1580, the status signal creation circuit 1590, and the selection signal creation circuit 1501 as shown in FIG. 4.

The transition-1 detection unit 1510 operates in rising of the high frequency clock VCLK given from the high frequency clock creation circuit 110, detects rising of the clock 1 signal which the clock 1 creation circuit 1 outputs, and outputs the pulse signal of 1 clock width of the high frequency clock VCLK as a detected signal 1.

The control signal-1 creation unit 1520 operates in rising of the high frequency clock VCLK, and outputs control signal 1*a* and control signal 1*b* based on the control data 1 which the output of the transition-1 detection unit 1510 and the control data creation circuit 1580 output. The clock 1 creation circuit 1530 operates in rising of the high frequency clock VCLK, and creates the clock 1 based on control signal 1a and control signal 1b.

On the other hand, the transition-2 detection unit 1540 operate in falling of the high frequency clock VCLK, detect rising of the clock 2 signal which the clock 2 creation circuit 1560 outputs, and output the pulse signal of 1 clock width of the high frequency clock VCLK as a detected signal 2.

The control signal-2 creation unit 1550 operates in falling of the high frequency clock VCLK, and outputs the control signal 2a and the control signal 2b based on the control data 2 outputted by the control data creation circuit 1580 and the output of the transition-2 detection unit 1540. The clock 2 creation circuit 1560 operates in falling of the high frequency clock VCLK, and creates the clock 2 based on the control signal 2a and the control signal 2b.

The multiplexer 1570 chooses the clock 1 and the clock 2 based on the selection signal from the selection signal creation circuit 1501, and outputs them as a pixel clock PCLK.

The control data creation circuit 1580 outputs the control data 1 and the control data 2 based on the status signal which the phase data and the status signal creation circuit 1590 which are given from the phase data creation circuit 140 output.

The phase data in this embodiment is the data for directing the amount of shifts of the phase of the pixel clock, in order to correct scanning irregularities which arise with the characteristics of the scanning lens, to correct the dot position deviation produced by rotation irregularities of the polygon mirror or to correct the dot position deviation produced by the chromatic aberration of laser light, and it considers as 3-bit composition here, and the amount of phase shifts and phase data are made to correspond like FIG. 9.

When the least-significant bit 0 of phase data is 1, at the timing of rising of the pixel clock PCLK, the status signal creation circuit 1590 carries out the toggle of the signal, and is outputted as a status signal.

Thereby, the status signal comes to show the second state, when the pixel clock PCLK rises at the time of rising of the high frequency clock VCLK and the pixel clock PCLK falls the first state at the time of falling of the high frequency clock VCLK.

Here, the status signal is set to "0" when the pixel clock PCLK rises at the time of rising of the high frequency clock VCLK, and it is set as "1" when the pixel clock PCLK falls at the time of falling of the high frequency clock VCLK.

When the bit 0 of phase data is 1, at the timing of falling of the pixel clock PCLK, the selection signal creation circuit 1501 carries out the toggle of the signal, and is outputted as a selection signal.

Figure 5:
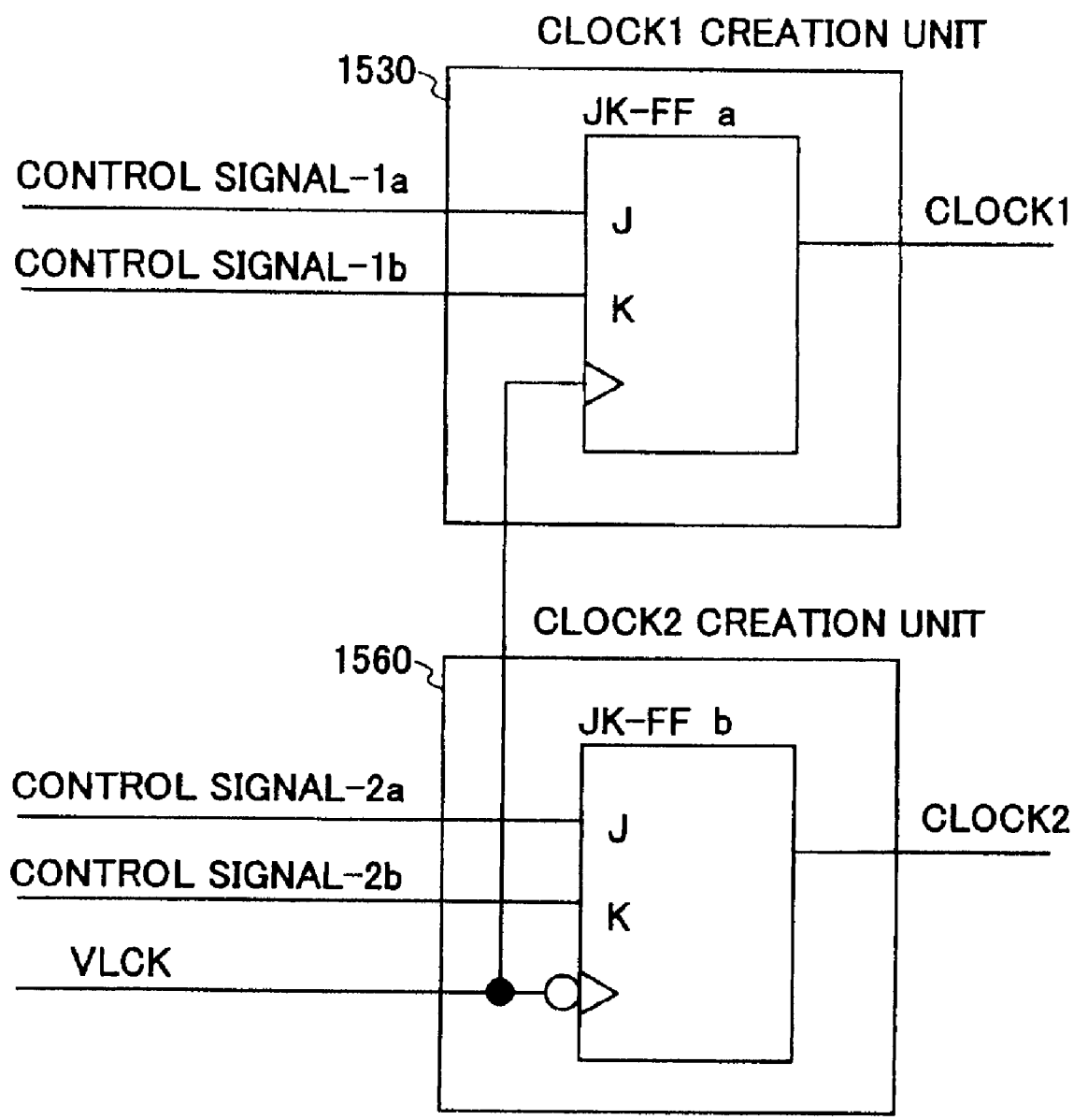
FIG. 5 is a diagram showing an example of the composition of the clock1 creation circuit and the clock2 creation circuit in FIG. 4.
Figure 6:
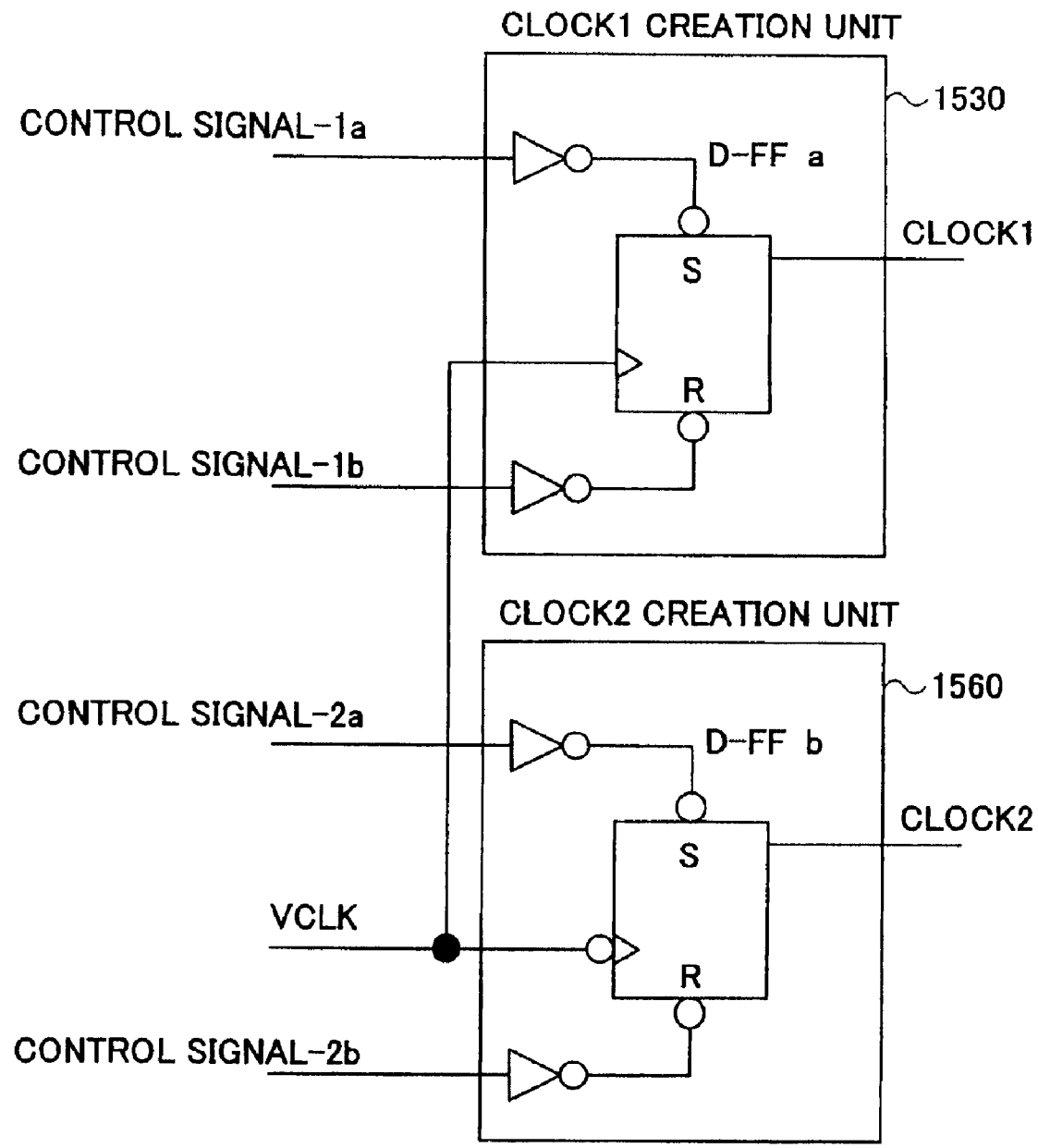
FIG. 6 is a diagram showing another example of the composition of the clock1 creation circuit and the clock2 creation circuit in FIG. 4.

FIG. 5 and FIG. 6 show examples of the composition of the clock 1 creation circuit 1530 and the clock 2 creation circuit 1560 in FIG. 4.

The example of FIG. 5 comprises the JK flip-flops (JK-FF), including JK-FFa which forms the clock 1 creation circuit 1530 and operates in rising of the high frequency clock VCLK, and JK-FFb which forms the clock 2 creation circuit 1560 and operates in falling of the high frequency clock VCLK.

The example of FIG. 6 comprises the D type flip-flops (D-FF) with clock locking setting and resetting, including D-FFa which forms the clock 1 creation circuit 1530 and operates in rising of the high frequency clock VCLK, and D-FFb which forms the clock 2 creation circuit 1560 and operates in falling of the high frequency clock VCLK.

The operation of each of the examples of FIG. 5 and FIG. 6 is the same. When the control signal 1a is "H" and the control signal 1b is "L", it outputs "L" to the clock 1 in rising of the high frequency clock VCLK, and when the control signal 1a is "L" and the control signal 1b is "H", it outputs "H" to the clock 1 in rising of the high frequency clock VCLK. It outputs "L" to the clock 2 in falling of the high frequency clock VCLK when the control signal 2a is in "H" and the control signal 2b is "L". It outputs "H" to the clock 2 in falling of the high frequency clock VCLK when the control signal 2a is "L" and the control signal 2b is "H".

Figure 7:
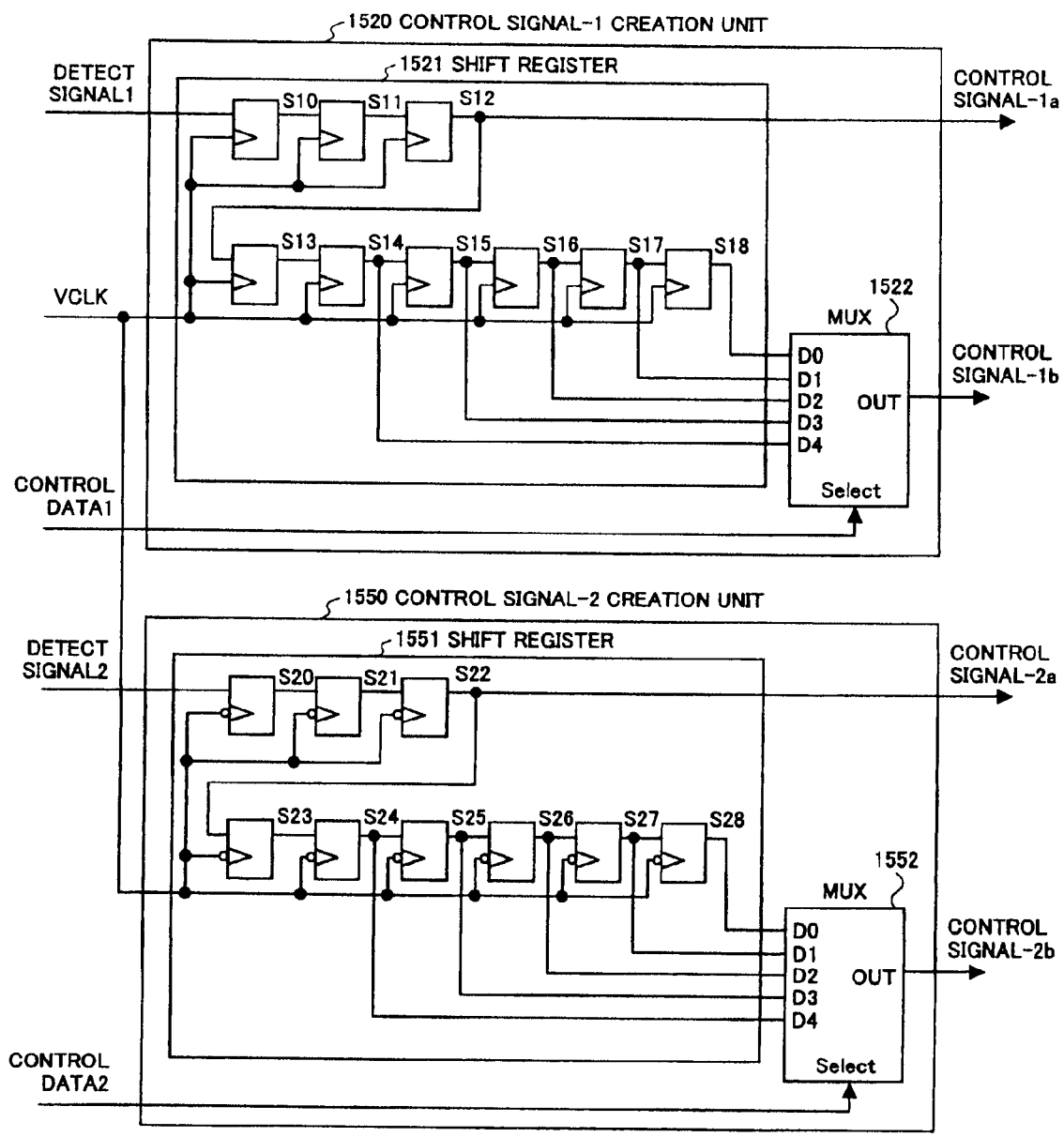
FIG. 7 is a diagram showing an example of the composition of the control signal-1 creation circuit and the control signal-2 creation circuit in FIG. 4.

FIG. 7 shows an example of the composition of the control signal-1 creation unit 1520 and the control signal-2 creation unit 1550 in FIG. 4.

As shown in FIG. 7, the control signal-1 creation unit 1520 and the control signal-2 creation unit 1550 are comprised of the shift register and the multiplexer. However, the shift register 1521 in the control signal-1 creation unit 1520 operates in rising of the high frequency clock VCLK, and the shift register 1551 in control signal-2 creation unit 1550 operates in falling of the high frequency clock VCLK.

The shift register 1521 and the shift register 1551 shift the detected signal 1 and the detected signal 2 which are inputted thereto. And the register output S22 is outputted as control signal 2a, using the register output S12 as control signal 1a, respectively.

Moreover, the register outputs S14-S18 are given to the multiplexer 1522, and the register outputs S24-S28 are given to the multiplexer 1552.

In the multiplexer 1522, according to the control data 1 given, either of the register outputs S14-S18 is chosen, and it outputs as control signal 1b. Similarly, in the multiplexer 1552, according to the control data 2 given, either of the register outputs S24-S28 is chosen, and it outputs as control signal 2b.

FIG. 8 shows the truth table of the multiplexer 1522 and the multiplexer 1552.

Next, the control data creation circuit 1580 in FIG. 4 will be explained.

The control data creation circuit 1580 outputs the decode, the control data 1, and the control data 2 for the status signal which the phase data and the status signal creation circuit 1590 which are given from the phase data creation circuit 140 output.

The operation of this control data creation circuit 1580 is related to the control signal-1 creation unit 1520 and the control signal-2 creation unit 1550. That is, the operation of the decoding of the control data creation circuit 1580 is decided by turn of the input of the output of the shift register 1521 of the control signal-1 creation unit 1520 and control signal-2 creation unit 1550, and the shift register 1551 and multiplexer 1522 in FIG. 7, and the multiplexer 1552.

FIG. 9 shows the correspondence of the amount of phase shifts and the phase data in this embodiment, and FIG. 10 shows the truth table of the control data creation circuit 1580.

Hereafter, operation of the whole pixel clock creation circuit 150 of FIG. 4 will be explained using the timing diagram of FIG. 11.

Figure 11:
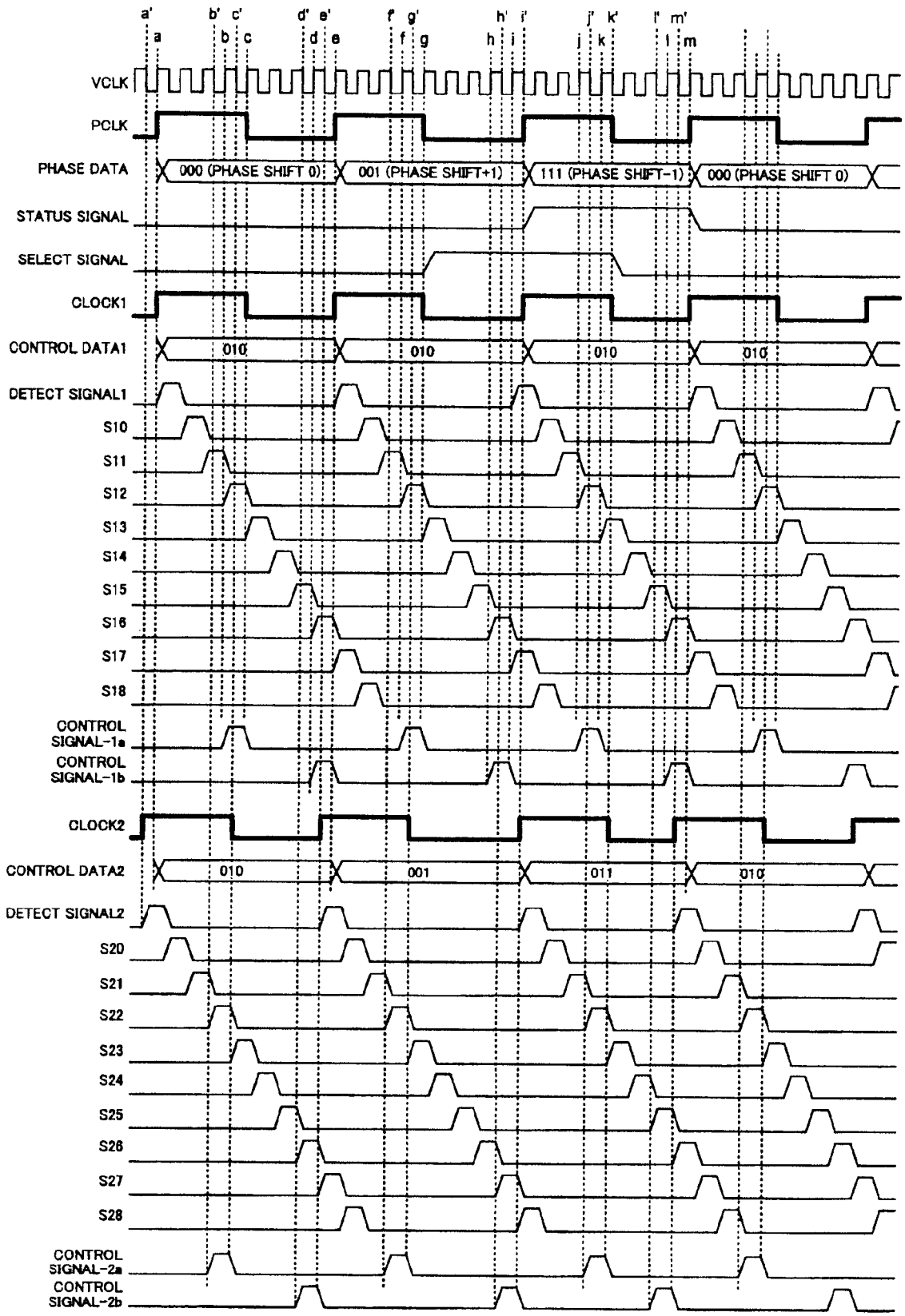
FIG. 11 is a timing diagram for explaining the operation of the pixel clock creation circuit of FIG. 4.

In the timing diagram of FIG. 11, it is shown that when the phase shift is 0, the pixel clock PCLK whose period is equivalent to 8 times the period of the high frequency clock VCLK is created, and the phase of the pixel clock PCLK is shifted, with respect to the timing of the phase shift 0, in the accuracy of half the period of the high frequency clock by $+\frac{1}{16}$PCLK or $-\frac{1}{16}$PCLK.

First, the creation of the pixel clock PCLK of the phase shift 0 will be explained.

(Creation of the Control Data 1 and the Control Data 2)

Synchronizing with the pixel clock PCLK, phase data"000" which indicates the phase shift 0 is given (a of FIG. 11). The status signal (referred to as 0 at first) of the phase data and status signal circuit 1590 is inputted into the control data creation circuit 1580, and the control data 1 (010) and the control data 2 (010) are outputted according to the truth table of FIG. 8.

(Creation of the Clock 1)

In a of FIG. 11, as rising of the clock 1 is detected by the transition-1 detection unit 1510 and is shown in FIG. 11, the pulse signal of 1 clock width of high frequency VCLK is acquired as a detected signal 1. This detected signal 1 is given to the shift register 1521 of control signal-1 creation unit 1520, and the signal of the register outputs S10-S18 as shown in FIG. 11 is acquired.

Since the control signal 1a is the register output S12 itself, it is set to "H" and the control signal 1a becomes "H" in the timing of the clock of c of FIG. 11 at the timing of b of FIG. 11, the clock 1 creation circuit 1530 makes the clock 1 change to "L", and is outputted. And since the control data 1 is "010", the register output S16 appears in control signal 1b which is the output of the multiplexer 1522 of control signal-1 creation unit 1520, and since it is set to "H" and control signal 1b becomes "H" in the timing of the clock of e of FIG. 11 at the timing of d of FIG. 11, the clock 1 creation circuit 1530 makes the clock 1 change to "H", and is outputted.

(Creation of Clock 2)

In a' of FIG. 11, as rising of the clock 2 is detected by transition-2 detection unit 1540 and is shown in FIG. 11, the detected signal 2 acquires the pulse signal of 1 clock width of high frequency VCLK. This detected signal 2 is given to the shift register 1551 of control signal-2 creation unit 1550, and the signal of the register outputs S20-S28 as shown in FIG. 11 is acquired.

Since the control signal 2a is the register output S22 itself, it is set to "H" and the control signal 2a becomes "H" in the timing of the clock of c' of FIG. 11 at the timing of b' of FIG. 11, the clock 2 creation circuit 1560 makes the clock 2 change to "L", and is outputted. And since the control data 2 is "010", the register output S26 appears in control signal 2b which is the output of the multiplexer 1552 of control signal-2 creation unit 1550, and since it is set to "H" and control signal 2b becomes "H" in the timing of the clock of e' of FIG. 11 at the timing of d' of FIG. 11, the clock 2 creation circuit 1550 makes the clock 2 change to "H", and is outputted.

(Creation of the Pixel Clock PCLK)

Here, since the selection signal of the selection signal creation circuit 1501 is "L" as shown in FIG. 11, the clock 1 is outputted from the multiplexer 1570 as a pixel clock PCLK.

Next, the creation of the pixel clock PCLK made to PCLK phase shift +1/16 will be explained.

(Creation of the Control Data 1 and the Control Data 2)

Synchronizing with the pixel clock PCLK, phase data"001" which shows the phase shift +1 is given (e of FIG. 11). Since bit0 of the phase data in front of it is "0", the toggle of the status signal of the status signal creation circuit 1590 is not carried out, but it is still "0".

The phase data and status signal are inputted into the control data creation circuit 1580, and the control data 1 (010) and the control data 2 (001) are outputted according to the truth table of FIG. 8.

(Creation of Clock 1)

In e of FIG. 11, as rising of the clock 1 is detected by the changes detection unit 1510 and shown in FIG. 11, the detected signal 1 acquires the pulse signal of 1 clock width of high frequency VCLK. This detected signal 1 is given to the shift register 1521 of control signal-1 creation unit 1520, and the signal of the register outputs S10-S18 as shown in FIG. 11 is acquired.

Since the control signal 1a is register output S12 itself, it is set to "H" and control signal 1a becomes "H" in the timing of the clock of g of FIG. 11 at the timing of f of FIG. 11, the clock 1 creation circuit 1530 makes the clock 1 change to "L", and is outputted. And since the control data 1 is "010", the register output S16 appears in control signal 1b which is the output of the multiplexer 1522 of control signal-1 creation unit 1520, and since it is set to "H" and control signal 1b becomes "H" in the timing of the clock of i of FIG. 11 at the timing of h of FIG. 11, the clock 1 creation circuit 1520 makes the clock 1 change to "H", and is outputted.

(Creation of Clock 2)

In e' of FIG. 11, as rising of the clock 2 is detected by transition-2 detection unit 1540 and is shown in FIG. 11, the detected signal 2 acquires the pulse signal of 1 clock width of high frequency VCLK. This detected signal 2 is given to the shift register 1551 of control signal-2 creation unit 1550, and the signal of the register outputs S20-S28 as shown in FIG. 11 is acquired.

Since the control signal 2a is register output S22 itself, it is set to "H" and control signal 2a becomes "H" in the timing of the clock of g' of FIG. 11 at the timing of f' of FIG. 11, the clock 2 creation circuit makes the clock 2 change to "L", and is outputted.

And since the control data 2 is "001", the register output S27 appears in control signal 2b which is the output of the multiplexer 15852 of control signal circuit (2) 1550, and since it is set to "H" and control signal 2b becomes "H" in the timing of the clock of i' of FIG. 11 at the timing of h' of FIG. 11, the clock 2 creation circuit 1560 makes the clock 2 change to "H", and is outputted.

(Creation of the Pixel Clock PCLK)

Here, as shown in FIG. 1, since bit0 of phase data is "1", the toggle of the selection signal of the selection signal creation circuit 1501 is carried out at the timing of falling of the pixel clock PCLK of g of FIG. 1, and it is set to "1".

Therefore, after the clock 1 is outputted as a pixel clock PCLK (period of e to g of FIG. 1) and the selection signal is set to "1" from the multiplexer 1570 by g of FIG. 11 in the beginning, the clock 2 is outputted as a pixel clock PCLK (period of i to g of FIG. 11).

Next, the creation of the pixel clock PCLK made to PCLK phase shift 1/16 is explained.

(Creation of the Control Data 1 and the Control Data 2)

Synchronizing with the pixel clock PCLK, phase data"101" which shows the phase shift 1 is given (i' of FIG. 11). Since bit0 of the phase data in front of it is "1", the toggle of the status signal of the status signal creation circuit 1590 is carried out, and it is set to "1" (i' of FIG. 11).

The phase data and status signal are inputted into the control data creation circuit 1580, and the control data 1 (010) and the control data 2 (011) are outputted according to the truth table of FIG. 8.

(Creation of Clock 1)

In i of FIG. 11, as rising of the clock 1 is detected by the transition-1 detection unit 1510 and is shown in FIG. 11, the detected signal 1 acquires the pulse signal of 1 clock width of high frequency VCLK.

This detected signal 1 is given to the shift register 1521 of control signal circuit (1) 1520, and the signal of the register outputs S10-S18 as shown in FIG. 11 is acquired.

Since control signal 1*a* is register output S12 itself, it is set to "H" and control signal 1*a* becomes "H" in the timing of the clock of k of FIG. 11 at the timing of k of FIG. 11, the clock 1 creation circuit 1530 makes the clock 1 change to "L", and is outputted.

And since the control data 1 is "010", the register output S16 appears in control signal 1*b* which is the output of the multiplexer 1522 of control signal circuit (1) 1520, and since it is set to "H" and control signal 1*b* becomes "H" in the timing of the clock of m of FIG. 11 at the timing of l of FIG. 11, the clock 1 creation circuit 1530 makes the clock 1 change to "H", and is outputted.

(Creation of Clock 2)

In i' of FIG. 11, as rising of the clock 2 is detected by transition-2 detection unit 1540 and is shown in FIG. 11, the detected signal 2 acquires the pulse signal of 1 clock width of high frequency VCLK.

The detected signal 2 is given to the shift register 1551 of control signal circuit (2) 1550, and the signal of the register outputs S20-S28 as shown in FIG. 11 is acquired.

Since control signal 2*a* is register output S22 itself, it is set to "H" and control signal 2*a* becomes "H" in the timing of the clock of j' of FIG. 11 at the timing of j' of FIG. 11, the clock 2 creation circuit 1560 makes the clock 2 change to "L", and is outputted.

And since the control data 2 is "011", the register output S25 appears in control signal 2*b* which is the output of the multiplexer 1552 of the control signal-2 creation unit, and since it is set to "H" and control signal 2*b* becomes "H" in the timing of the clock of m' of FIG. 11 at the timing of l' of FIG. 11, the clock 2 creation circuit 1560 makes the clock 2 change to "H", and is outputted.

(Creation of the Pixel Clock PCLK)

Here, since bit0 of phase data is "1", the toggle of the selection signal of the selection signal creation circuit 1501 is carried out at the timing of falling of the pixel clock PCLK of k' of FIG. 11, and it is set to "0."

Therefore, after the clock 2 is outputted as a pixel clock PCLK (period of i' to k' of FIG. 11) and the selection signal is set to "0" from the multiplexer 1570 by k' of FIG. 11 in the beginning, the clock 1 is outputted as a pixel clock PCLK (period of k' to m in FIG. 11).

Although only the phase shift 0, +$\frac{1}{16}$PCLK and −$\frac{1}{16}$PCLK are explained, it can carry out similarly about +$\frac{2}{16}$PCLK, +$\frac{3}{16}$PCLK, −$\frac{2}{16}$PCLK, and −$\frac{3}{16}$PCLK.

As mentioned above, the pixel clock PCLK in which are the one every clock, and ±$\frac{1}{16}$PCLK steps, namely, the phase shift is carried out by the composition of the pixel clock creation circuit 150 of FIG. 4 in the accuracy of the half steps of the high frequency VCLK can be obtained.

In addition, if the clock which made transition-2 detection unit 1540, control signal-2 creation unit 1550, and the clock 2 creation circuit 1560 reverse the high frequency clock VCLK is given in FIG. 4.

These transition-2 detection unit 1540, control signal-2 creation unit 1550, and the clock 2 creation circuit 1560 can be constituted from the same parts as the transition-1 detection unit 1510, control signal-1 creation unit 1520, and the clock 2 creation circuit 1530, and cost becomes cheap.

Figure 12:
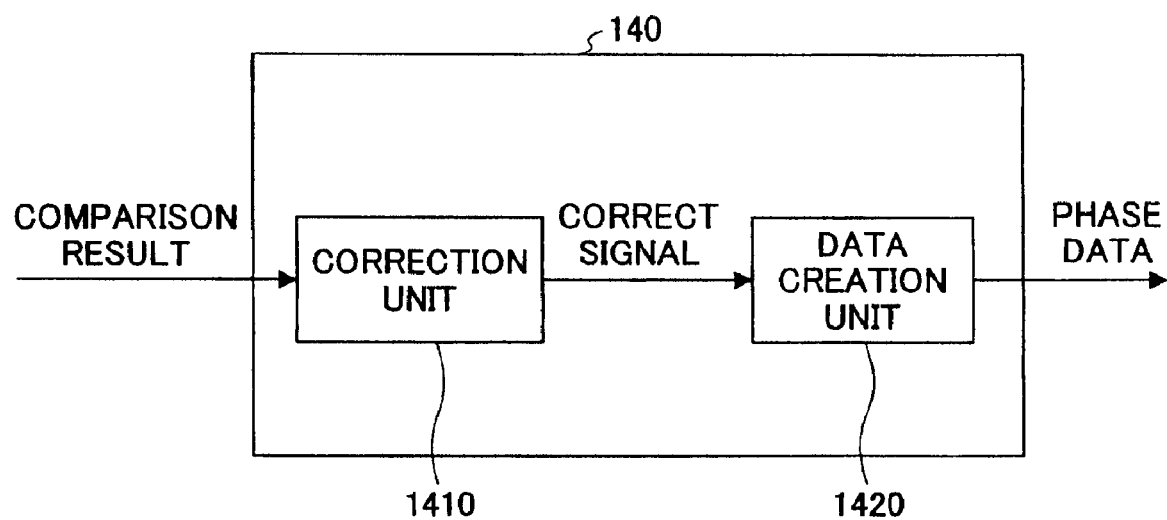
FIG. 12 is a block diagram of an embodiment of the phase data creation circuit in FIG. 2.

FIG. 12 is a block diagram of the phase data creation circuit 140 in FIG. 2.

The phase data creation circuit 140 comprises the compensation circuit 1410 and the data creation circuit 1420 in FIG. 12. The compensation circuit 1410 outputs the compensation signal based on the comparison result.

The data creation circuit 1420 outputs phase data based on the compensation signal. Here, the compensation circuit 1410 comprises the integrators.

Figure 13:
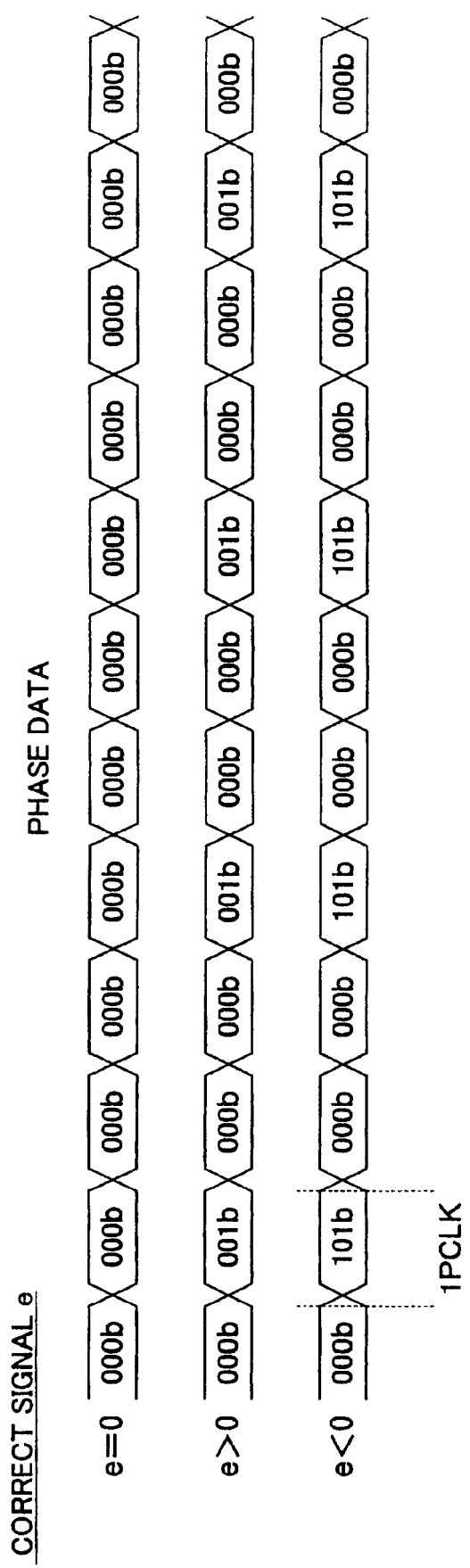
FIG. 13 is a diagram for explaining the operation of the phase data creation circuit of FIG. 12.

FIG. 13 shows the operation of the data creation circuit 1420 of FIG. 12. When the value of the compensation signal e given to the data creation circuit 1420 is "0", it creates the phase data of "000b" altogether.

Moreover, when the value of e is positive, "001b" is given to the phase data for the pixel clock PCLK so that each other interval may become almost equal, and "000b" is given to other phase data.

Moreover, when the value of e is negative, "101b" is given to the phase data for every pixel clock PCLK so that each other interval may become almost equal, and "000b" is given to other phase data. By doing in this way, the scan width for every line can be arranged by distributing the pixel clock PCLK to which the phase is shifted, lessening the undesired influences on the image.

Figure 14:
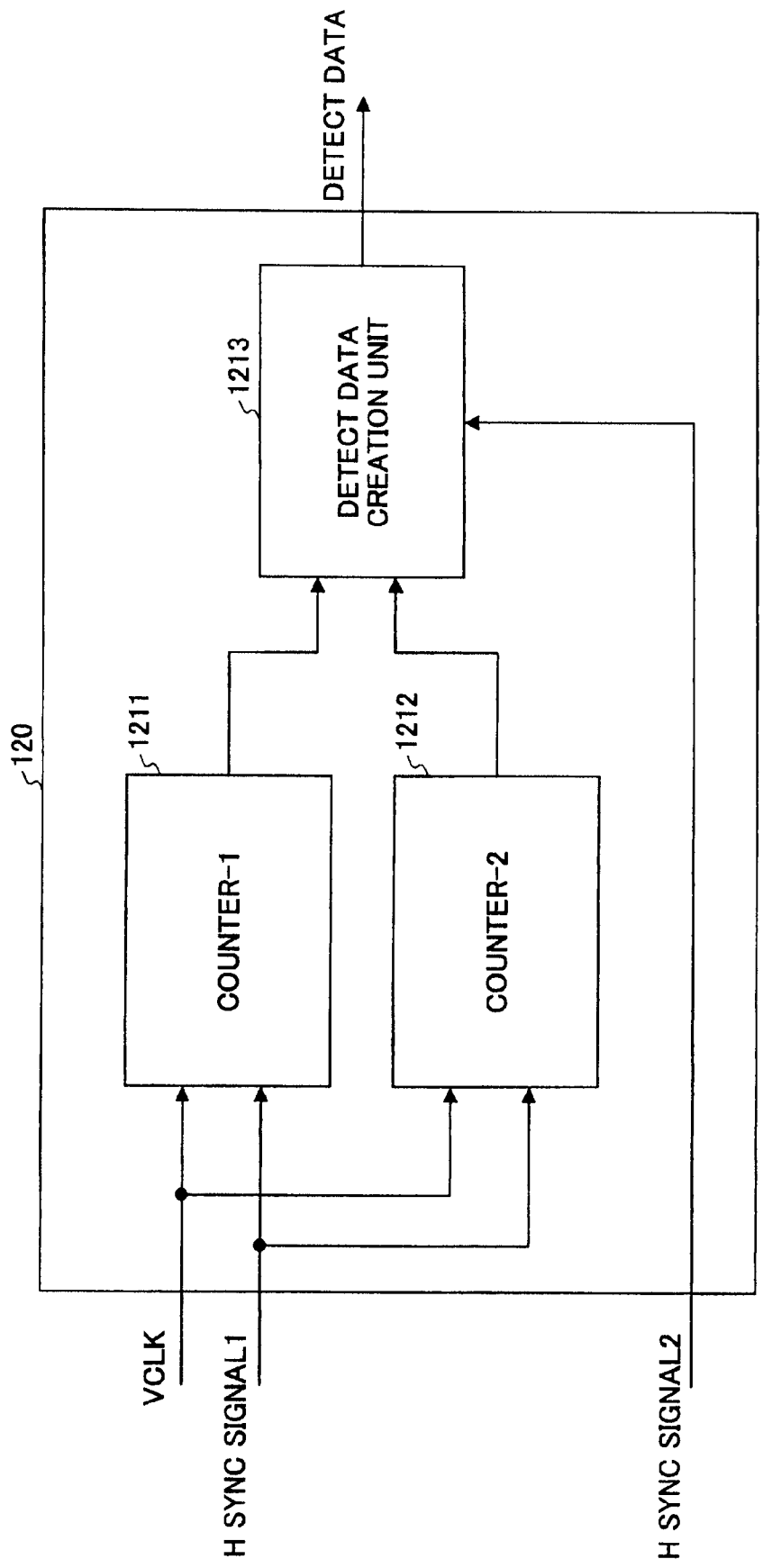
FIG. 14 is a block diagram of a first embodiment of the detection unit in FIG. 2.

FIG. 14 is a block diagram of the first embodiment of the detection unit 120 in FIG. 2.

The detection unit 120 comprises the detection data creation circuit 1213 which creates detection data from the output value and horizontal sync signal2 of counter (2) 1212 counted in falling of counter (1) 1211 and the high frequency clock VCLK counted in rising of the high frequency clock VCLK on the basis of the horizontal sync signal 1, counter (1) 1211, and counter (2) 1212 in FIG. 14.

Figure 15:
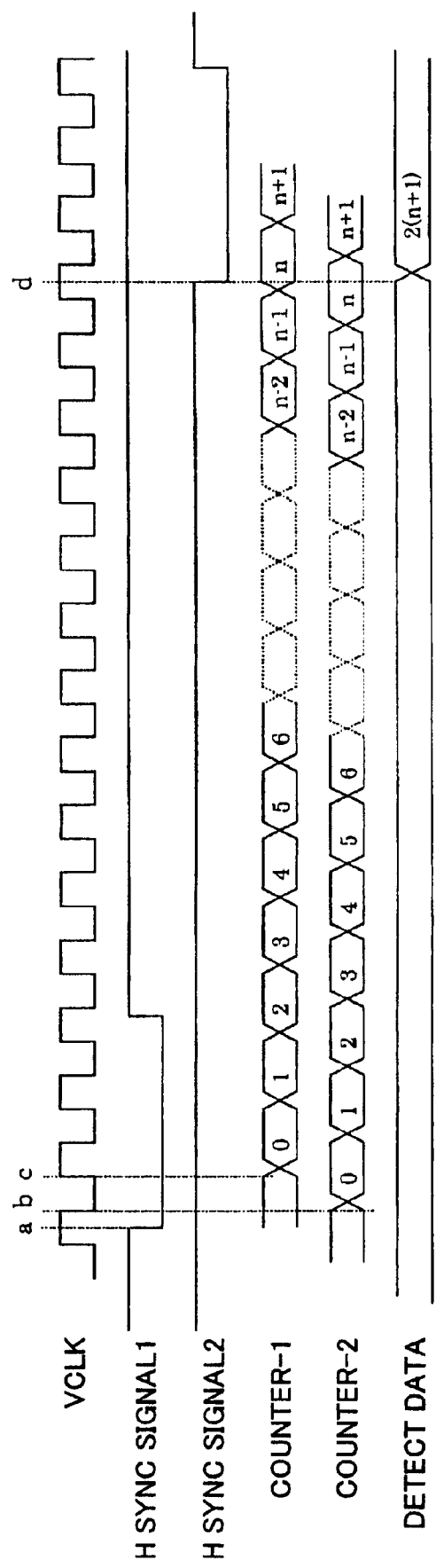
FIG. 15 is a diagram for explaining the operation of the detection unit of FIG. 14.
Figure 16:
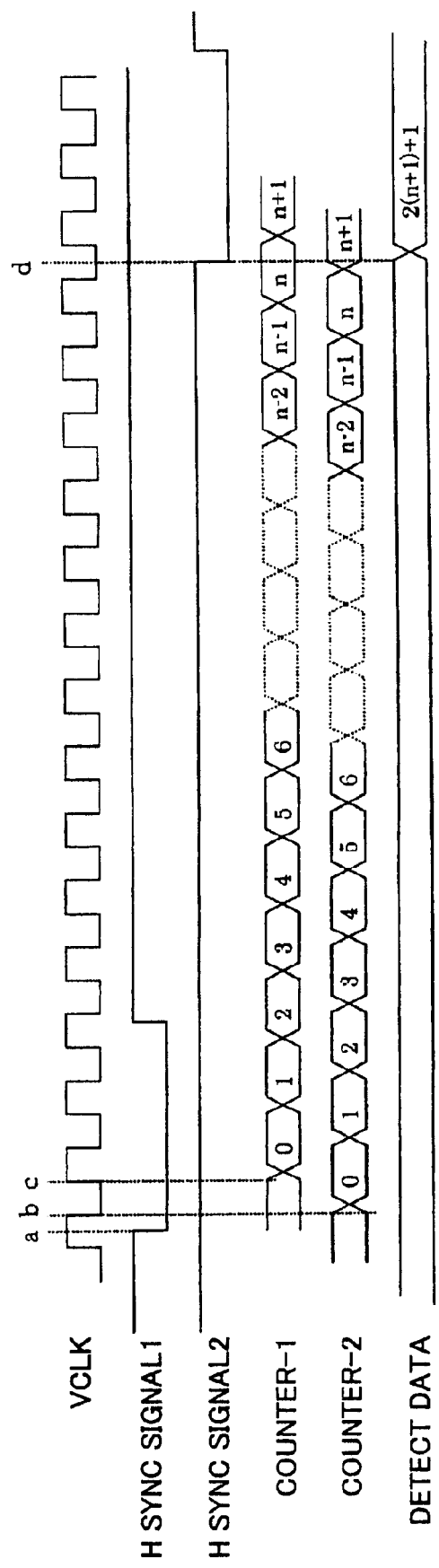
FIG. 16 is a diagram for explaining the operation of the detection unit of FIG. 14.

FIG. 15 and FIG. 16 show the case where it falls when the horizontal sync signal1 is in the state of "H" of VCLK.

Counter (2) 1212 are previously reset by 0 (b of FIG. 15, b of FIG. 16), next counter (1) 1211 are reset by 0 (c of FIG. 15, c of FIG. 16), and the count is carried out by what (a of FIG. 15, a of FIG. 16) the horizontal sync signal1 fell.

And when the horizontal sync signal2 is in the state of "H" of VCLK and it falls (d of FIG. 15), the count value of counter (1) 1211 and counter (2) 1212 can be the same, and can create the interval of falling of the horizontal sync signal2 from falling of the horizontal sync signal1 by calculating 2 (n+1) in the detection data creation circuit 1213 with the number of the clocks in ½ clock steps of VCLK.

Moreover, when the horizontal sync signal2 is in the state of "L" of VCLK and it falls (d of FIG. 16), the counter (1) has the value of counter (2) 1212 is larger than 1211, in this case in the detection data creation circuit 1213.

Counter (1) By calculating 2 (n+1)+1 using the value of 1211, the interval of falling of the horizontal sync signal2 can be created from falling of the horizontal sync signal1 with the number of the clocks in ½ clock steps of VCLK.

Figure 17:
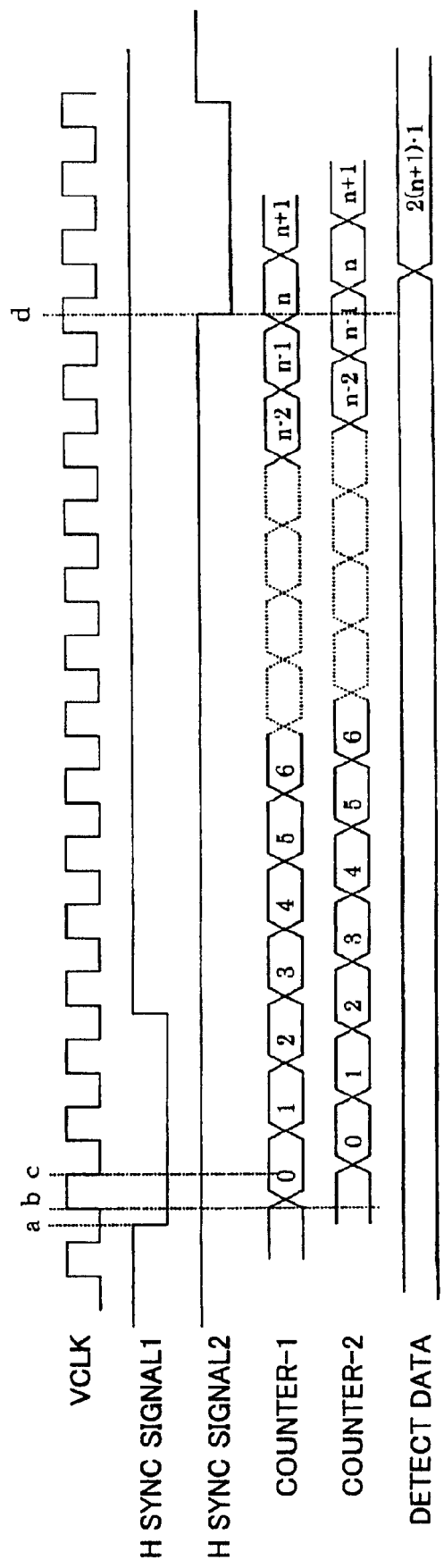
FIG. 17 is a diagram for explaining the operation of the detection unit of FIG. 14.
Figure 18:
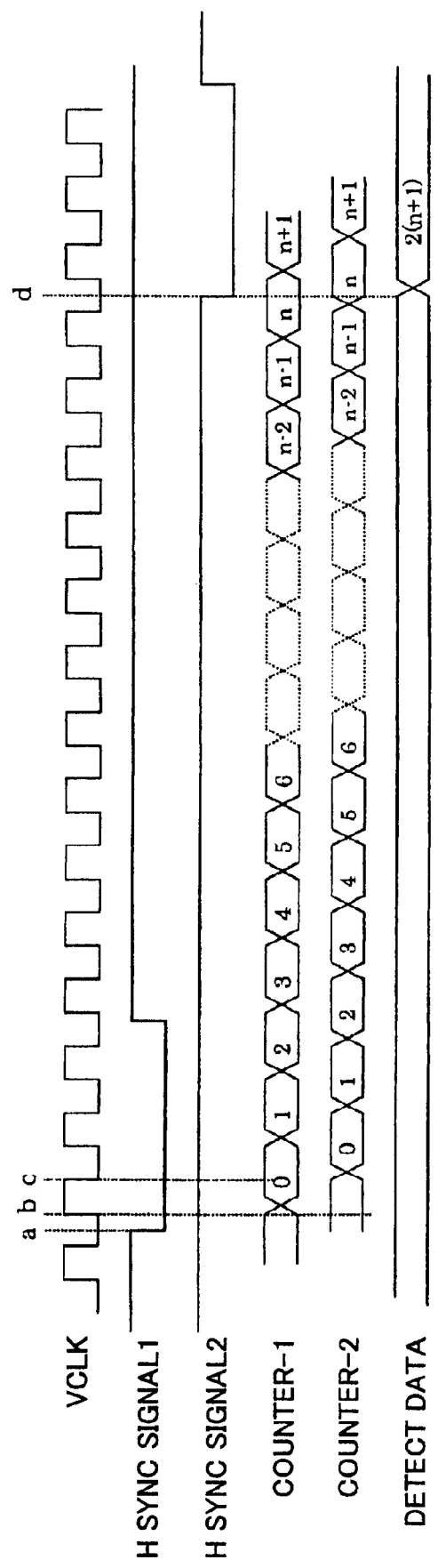
FIG. 18 is a diagram for explaining the operation of the detection unit of FIG. 14.

FIG. 17 and FIG. 18 show the case where it falls when the horizontal sync signal1 is in the state of "L" of VCLK.

Counter (1) 1211 are previously reset by 0 (b of FIG. 17, b of FIG. 18), next counter (2) 1212 are reset by 0 (c of FIG. 17, c of FIG. 18), and the count is carried out by what (a of FIG. 17, a of FIG. 18) the horizontal sync signal1 fell.

And when the horizontal sync signal2 is in the state of "H" of VCLK and it falls (d of FIG. 17), the counter (1) when the value of 1211 is larger than counter (2) 1212 and it calculates 2 (n+1)−1 in this case in the detection data creation circuit 1213 using the value of counter (1) 1211. The interval of falling of the horizontal sync signal2 can be created from falling of the horizontal sync signal1 with the number of the clocks in ½ clock steps of VCLK.

Moreover, when the horizontal sync signal2 is in the state of "L" of VCLK and it falls (d of FIG. 18), the count value of counter (1) 1211 and counter (2) 1212 can be the same, and can create the interval of falling of the horizontal sync signal2 from falling of the horizontal sync signal1 by calculating 2(n+1) in the detection data creation circuit 1213 with the number of the clocks in ½ clock steps of VCLK.

As mentioned above, in the detection data creation circuit 1213, the detection data is outputted based on the count (1) of the counter (1) 1211 and the count (2) of the counter (2) 1212 when the horizontal sync signal2 falls, as follows: (i) in the case of counter (1)=counter (2), the detection data=2×(the value of the counter (1)+1); (ii) in the case of counter (1)>counter (2), the detection data=2×(value of counter (1)+1)−1; (iii) in the case of counter (1)<counter (2), the detection data=2×(value of counter (1)+1)+1.

Figure 19:
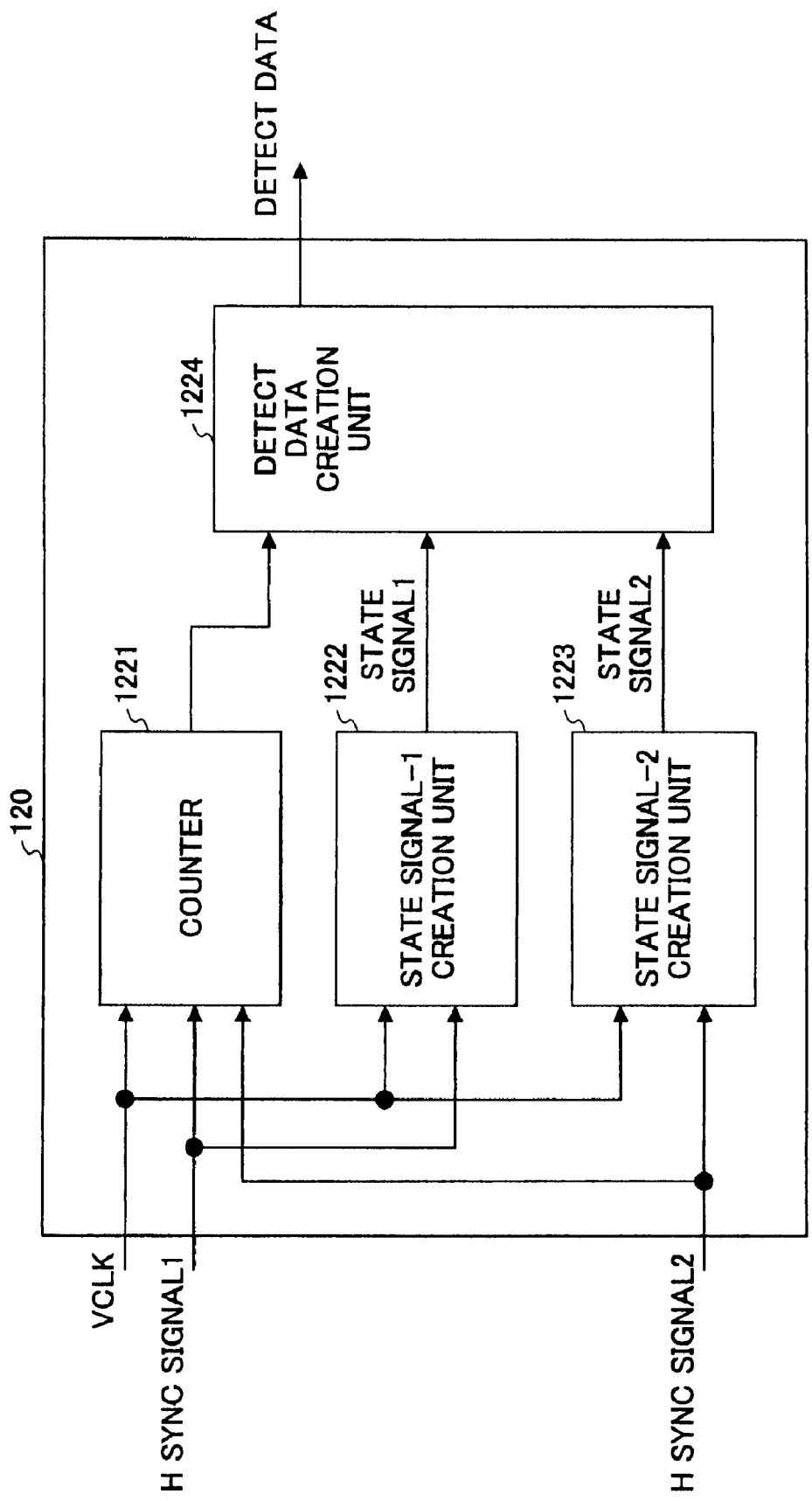
FIG. 19 is a block diagram of a second embodiment of the detection unit in FIG. 2.

FIG. 19 is a block diagram of the second embodiment of the detection unit 120 in FIG. 2.

The counter 1221 which counts the detection unit 120 in rising of the high frequency clock VCLK in FIG. 19. State creation circuit (1) 1222 which create the state signal 1 which shows the state of VCLK when the horizontal sync signal1 falls.

It comprises in the detection data creation circuit 1224 which creates detection data from state creation circuit (2) 1223 which create the state signal 2 of VCLK when the horizontal sync signal2 falls, the count value of the counter 1221, the state signal 1, and the state signal 2.

Figure 20:
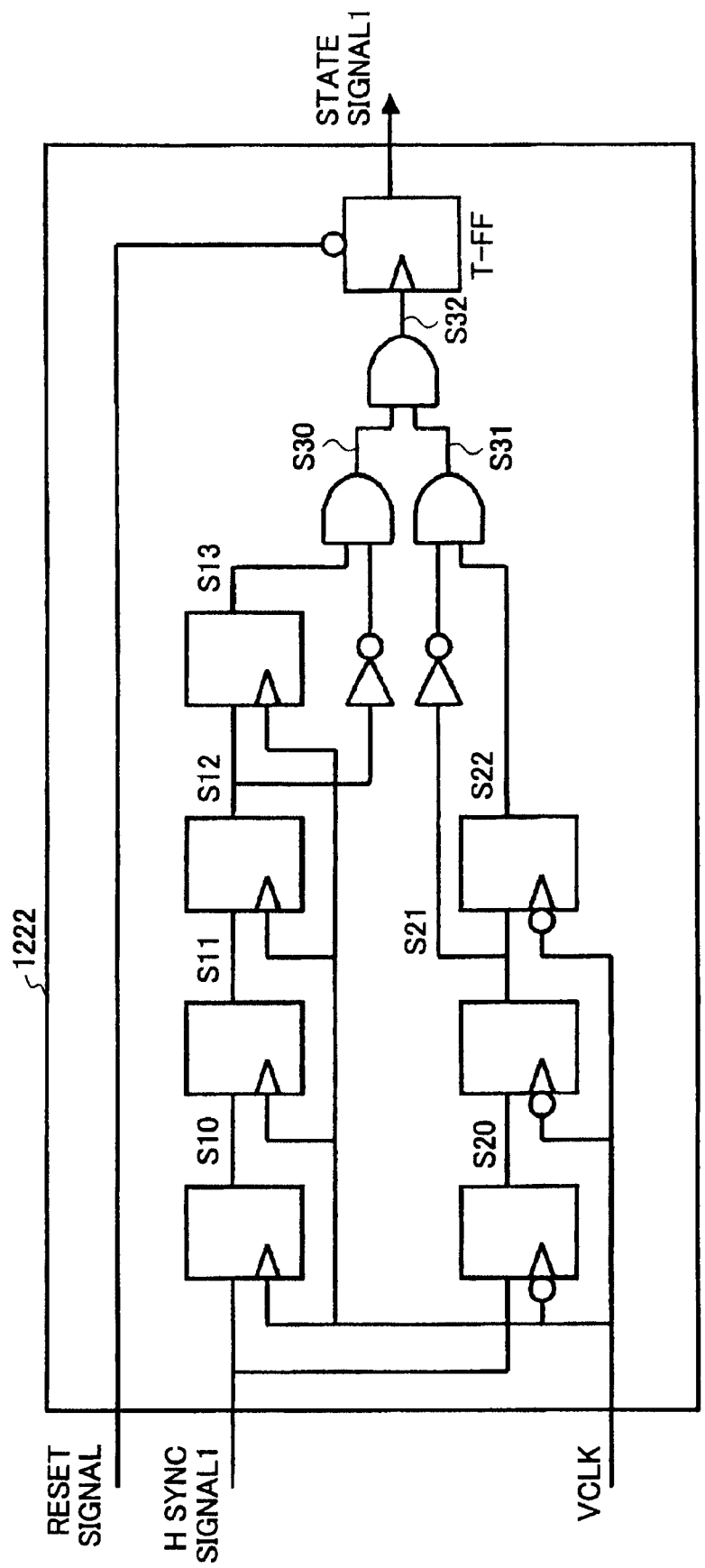
FIG. 20 is a diagram showing an example of the composition of the state signal-1 creation circuit in FIG. 19.

The example of composition of state signal creation circuit (1) 1222 is shown in FIG. 20.

State signal creation circuit (2) The composition of 1223 also becomes the same. The timing view of state signal creation circuit (1) 1222 of operation of FIG. 20 is shown in FIG. 21 and FIG. 22.

Figure 21:
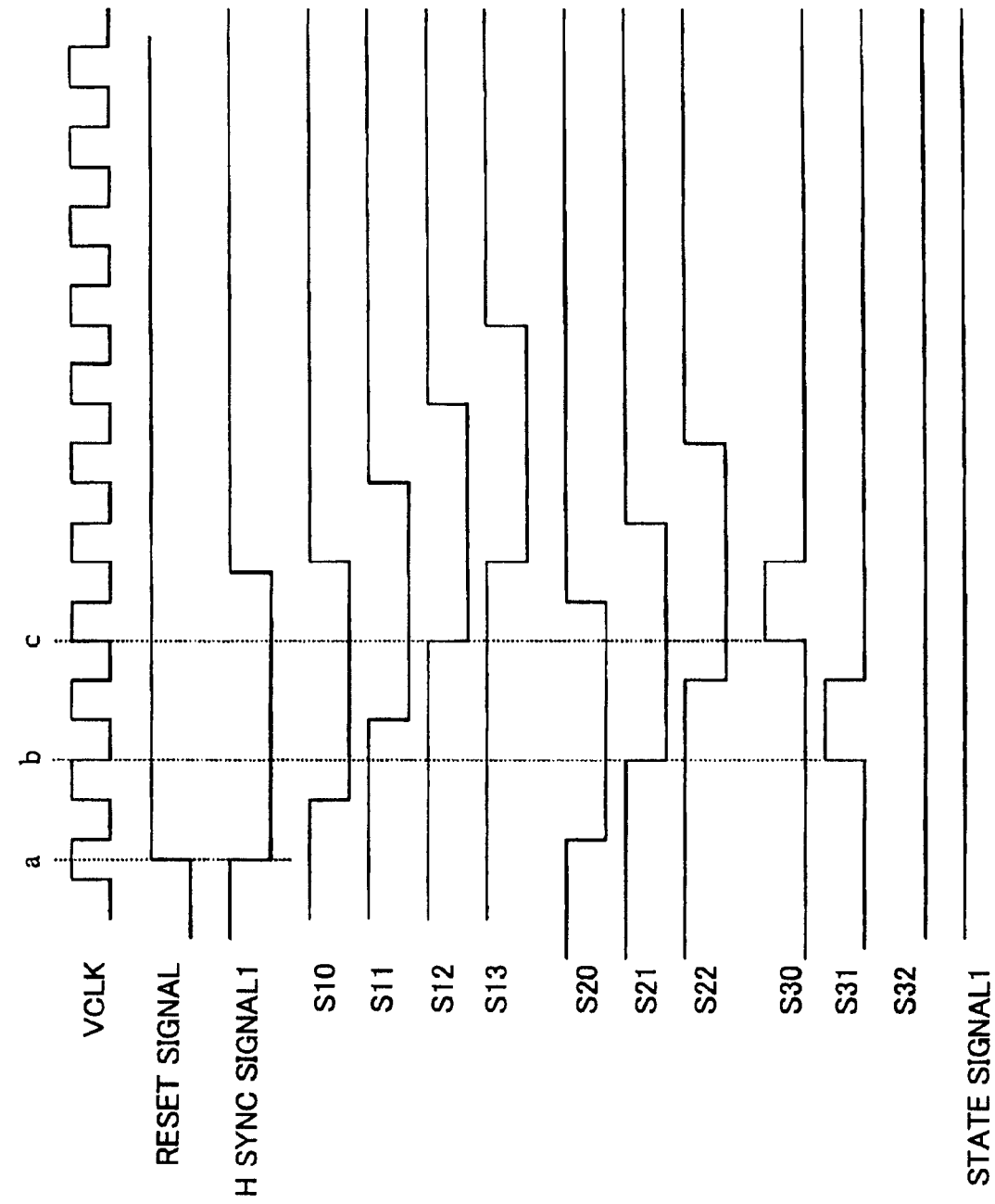
FIG. 21 is a timing diagram for explaining the operation of the state signal-1 creation circuit of FIG. 20.
Figure 22:
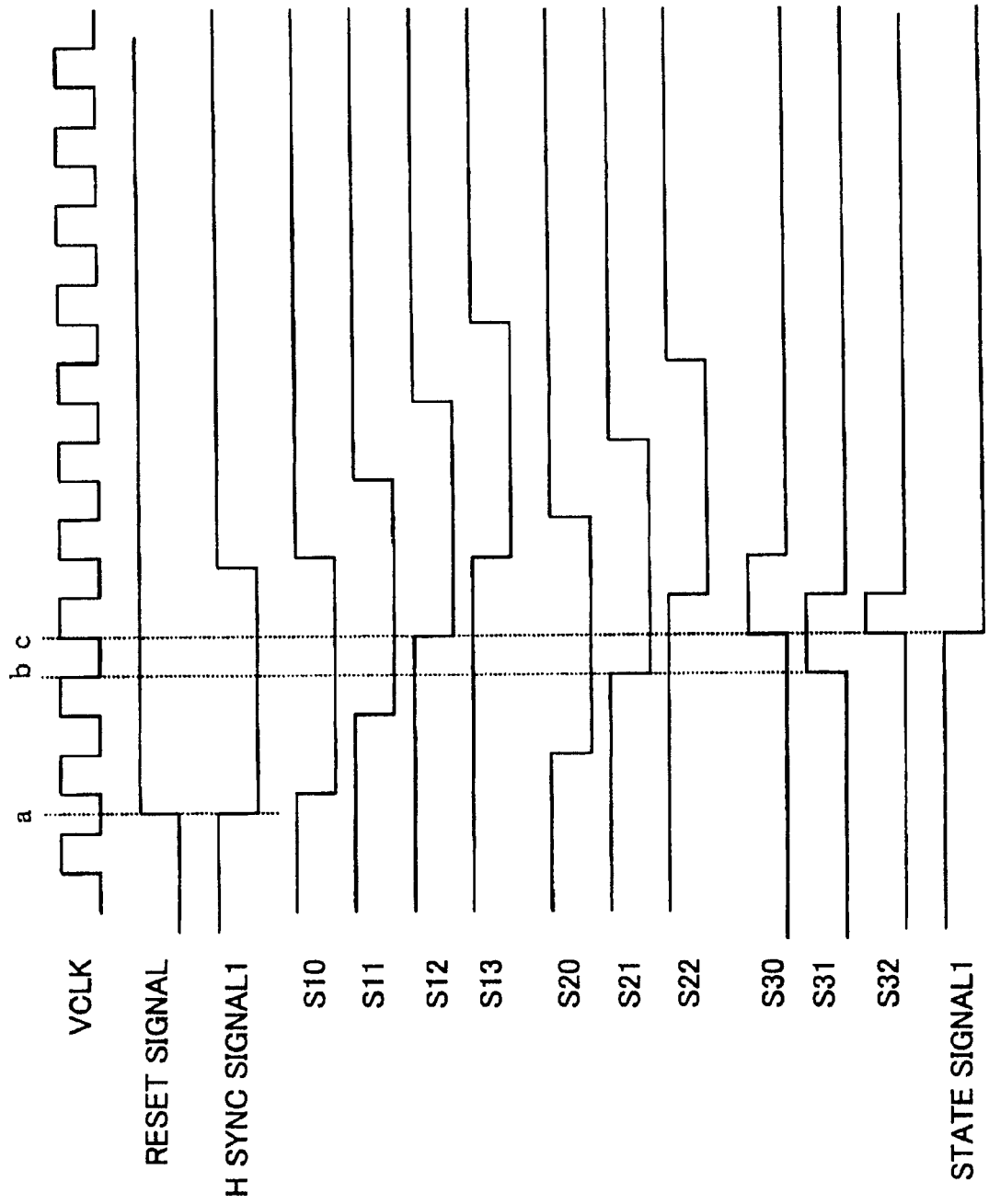
FIG. 22 is a timing diagram for explaining the operation of the state signal-1 creation circuit of FIG. 20.

FIG. 21 shows the case where it falls when the horizontal sync signal1 is in the state of "H" of VCLK.

Before the horizontal sync signal1 falls, the state signal 1 is set to "H" by setting the reset signal to "L" and resetting flip-flop T-FF of FIG. 20. The reset signal will be set to "H" if the horizontal sync signal1 falls (a of FIG. 21).

It creates the signals, such as S10-S13 as shown in FIG. 21, and S20-S22, by the horizontal sync signal's 1 rising, latching VCLK in falling, and shifting by the shift register.

And S31 is set to "H" at the timing of b of FIG. 21, and outputs the signal of 1VCLK width, and S30 is set to "H" at the timing of c of FIG. 21, and outputs the signal of 1VCLK width.

Since S30 and S31 are not simultaneously set to "H", the output of S32 is still "L". Therefore, the toggle of T-FF is not carried out, but the state signal 1 is still early "H."

FIG. 22 shows the case where it falls when the horizontal sync signal1 is in the state of "L" of VCLK.

Before the horizontal sync signal1 falls, the state signal 1 is set to "H" by setting the reset signal to "L" and resetting T-FF of FIG. 20. The reset signal will be set to "H" if the horizontal sync signal1 falls (a of FIG. 22).

It creates the signals, such as S10-S13 as shown in FIG. 22, and S20-S22, by the horizontal sync signal's 1 rising, latching VCLK in falling, and shifting by the shift register.

And S31 is set to "H" at the timing of b of FIG. 22, and outputs the signal of 1VCLK width, and S30 is set to "H" at the timing of c of FIG. 22, and outputs the signal of 1VCLK width.

Since S30 and S31 are simultaneously set to "H" at the timing of c of FIG. 22, the output of S32 is set to "H" at the timing of c of FIG. 22, and only the clock width of the half of VCLK outputs "H." T-FF carries out the toggle by this, and the state signal 1 is set to "L" at the timing of c of FIG. 22.

The state signal which shows the state of VCLK when the horizontal sync signal falls as mentioned above can be created.

In the detection data creation circuit 1224, the detection data is created based on the value n of the counter when the state signal 1, the state signal 2, and the horizontal sync signal2 fall, as follows: in the case of state signal1="L" and state signal2="L", the detection data=2(n+1); in the case of state signal1="H" and state signal2="H", the detection data=2(n+1); in the case of state signal1="H" and state signal2="L", the detection data=2(n+1)+1; in the case of state signal1="L" and state signal2="H", the detection data=2(n+1)−1.

Figure 23:
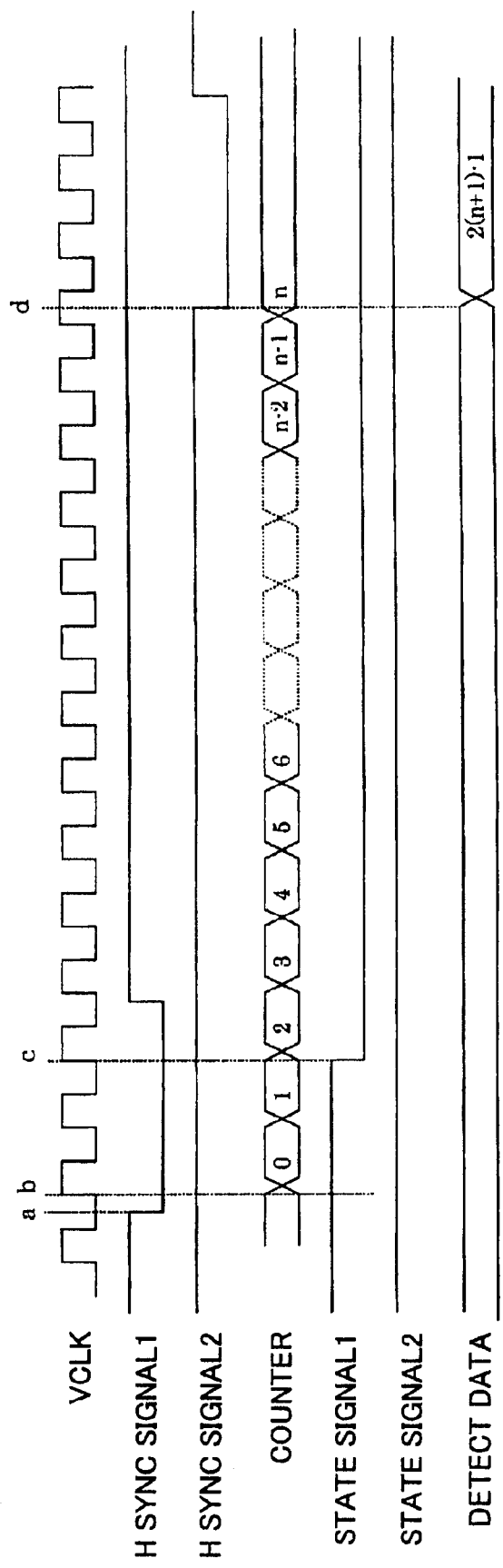
FIG. 23 is a timing diagram for explaining the operation of the detection unit of FIG. 19.

FIG. 23 is a timing diagram for explaining the operation of the whole detection unit 120 of FIG. 19.

Here, the case where the horizontal sync signal1 fell at the time of "L" of VCLK, and the horizontal sync signal2 falls at the time of "H" of VCLK is shown.

Suppose that the horizontal sync signal1 fell at the timing of a of FIG. 23. Thereby, the counter 1221 is reset at the timing of b of FIG. 23, and the count starts.

The state signal creation circuit (1) since the state signal 1 of 1222 fell when the horizontal sync signal1 was in the state of "L" of VCLK, it is set to "L" at the timing of c of FIG. 23.

Next, suppose that the horizontal sync signal2 fell at the timing of d of FIG. 23.

When the horizontal sync signal2 fell, count operation of the counter 1221 is stopped and the count value n at that time is held. Moreover, since the horizontal sync signal2 fell at the time of "H" of VCLK, the state signal 2 of state signal creation circuit (2) 1223 is still "H".

In the detection data creation circuit 1224, detection data is created and outputted from the state signal 1, the state signal 2, and the count value n.

As mentioned above, according to the composition of FIG. 19, the interval of falling of the horizontal sync signal2 can be created from falling of the horizontal sync signal1 with easier composition with the number of the clocks in ½ clock steps of VCLK.

Moreover, since there are few counters which operate by VCLK which is high frequency and they end, it also becomes curtailment of consumption current.

Figure 24:
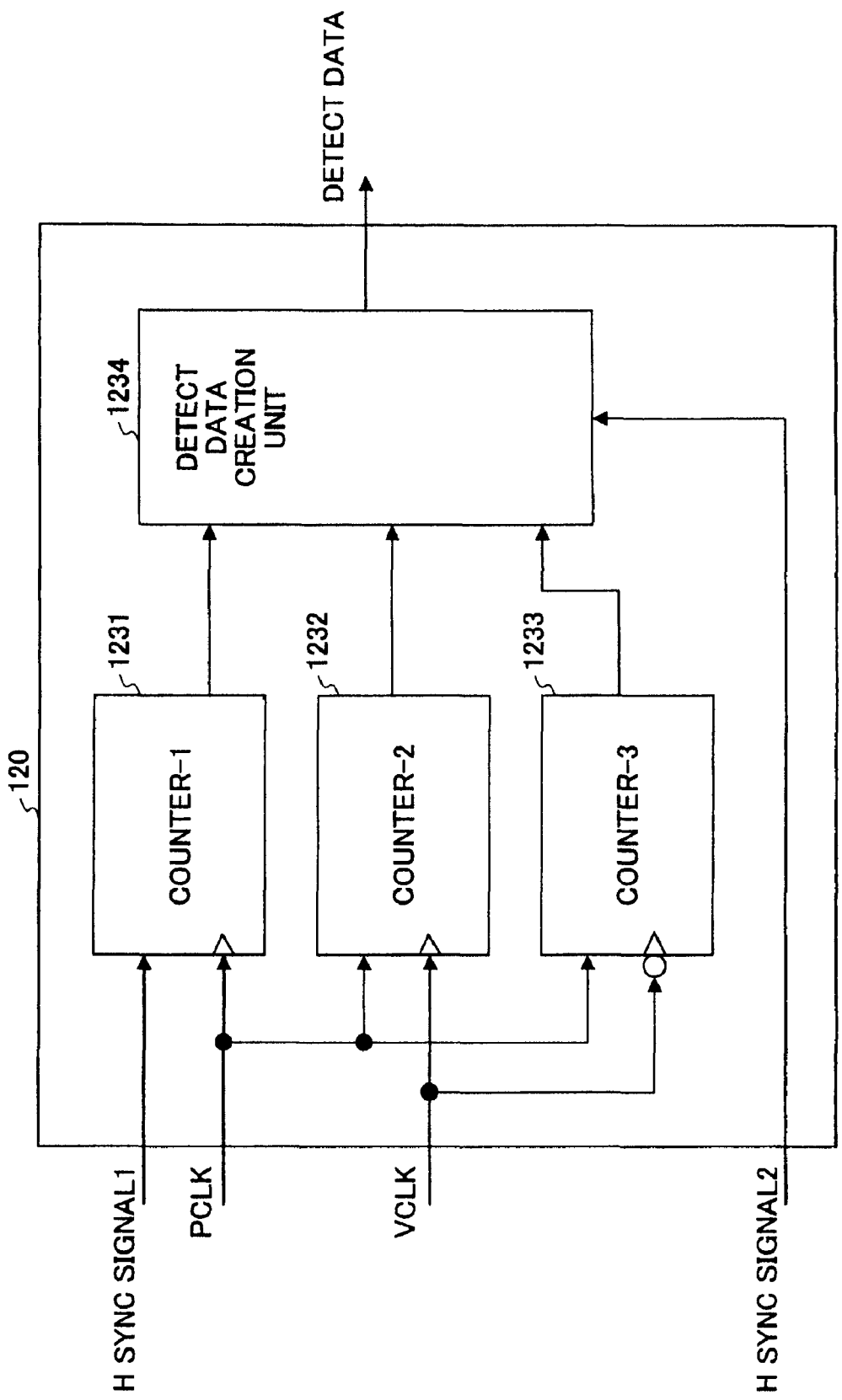
FIG. 24 is a block diagram of a third embodiment of the detection unit in FIG. 2.

FIG. 24 is a block diagram of the third embodiment of the detection unit in FIG. 2.

In FIG. 24, the pixel clock PCLK is given from the pixel clock creation circuit 150 synchronizing with falling of the horizontal sync signal1.

Counter (1) 1231 is a counter which it is reset based on falling of the horizontal sync signal1, and is counted by PCLK. Counter (2) 1232 is a counter which it is reset based on rising of PCLK and counted in rising of the high frequency clock VCLK. Counter (3) 1233 is a counter which it is reset based on rising of PCLK and counted in falling of VCLK.

The detection data creation circuits 1234 are counter (1) 1231 when the horizontal sync signal2 falls, counter (2) 1232, and the circuit that creates detection data from the value of counter (3) 1233.

Figure 25:
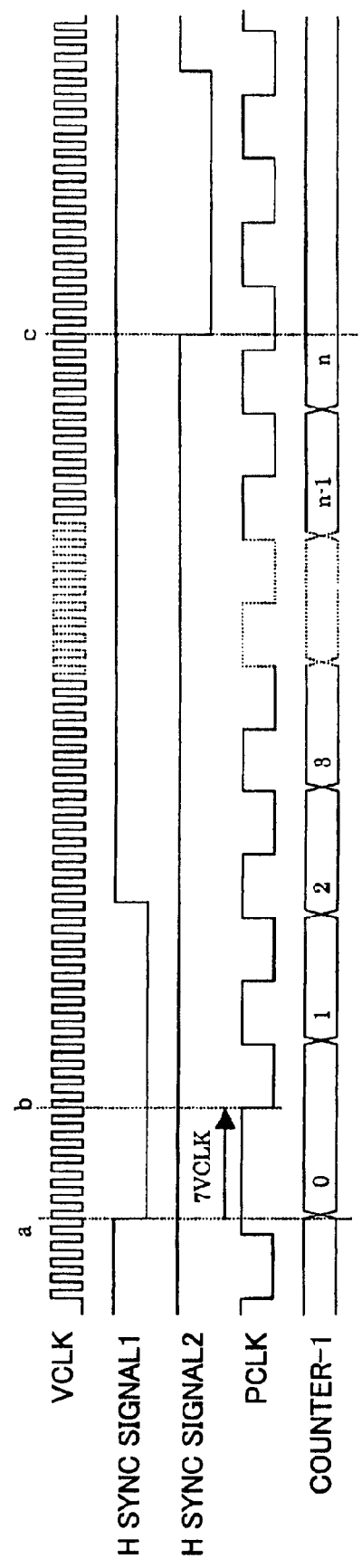
FIG. 25 is a timing diagram for explaining the operation of the counter-1 in FIG. 24.
Figure 26:
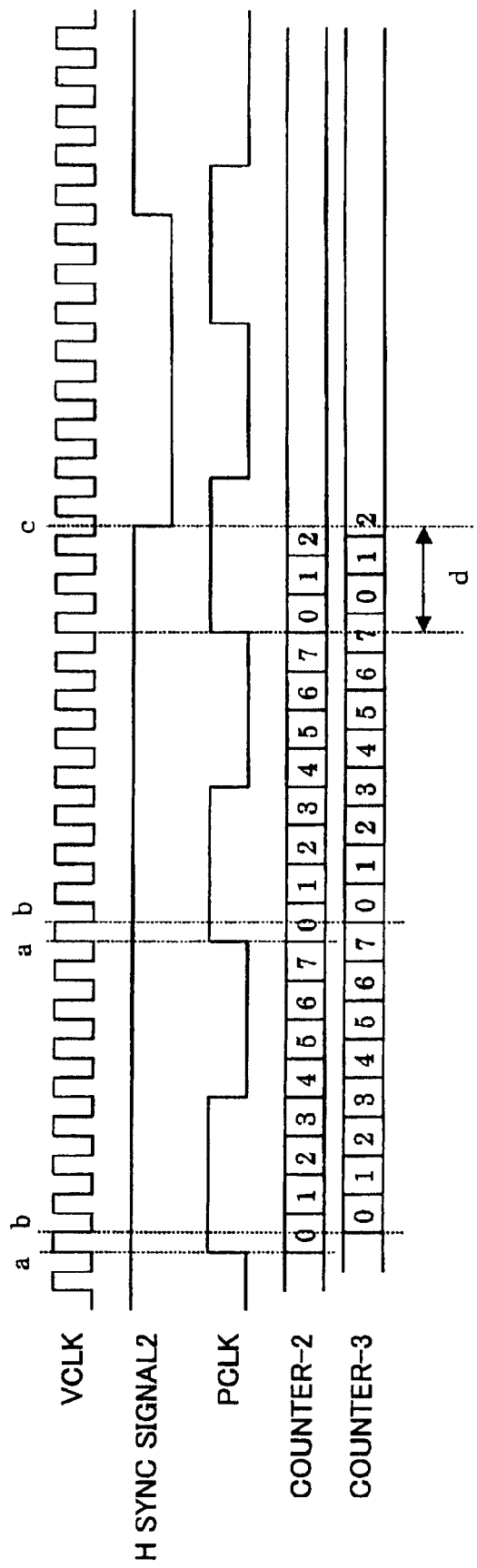
FIG. 26 is a timing diagram for explaining the operation of the counter-2 and the counter-3 in FIG. 24.
Figure 27:
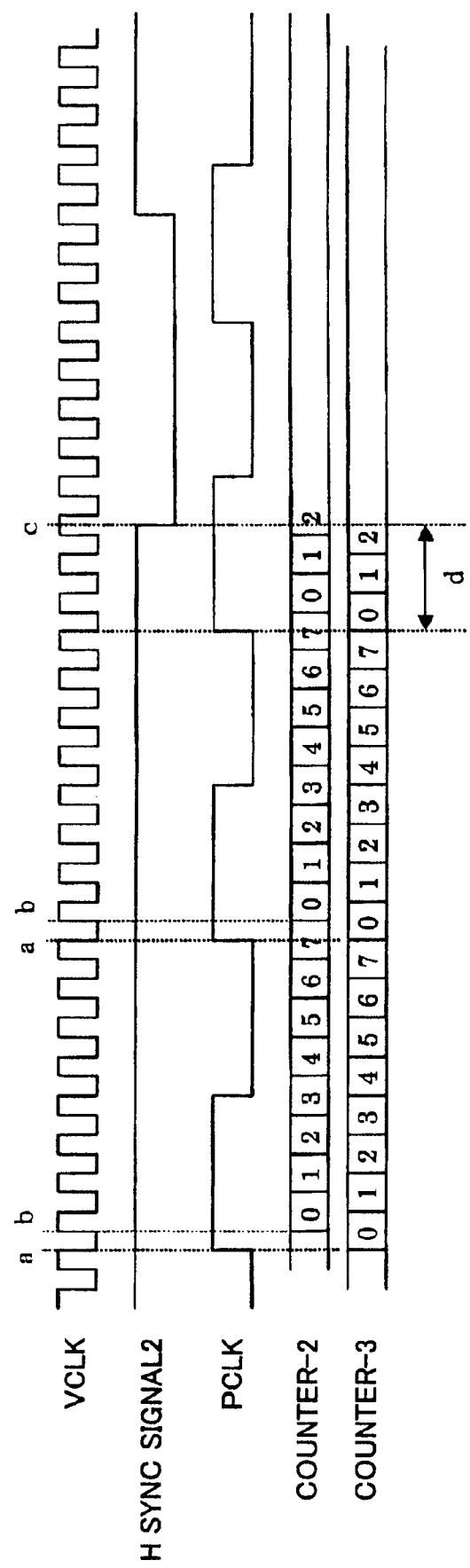
FIG. 27 is a timing diagram for explaining the operation of the counter-2 and the counter-3 in FIG. 24.

Counter (1) 1231 of FIG. 24, counter (2) 1232, and the timing of counter (3) 1233 of operation are shown in FIG. 25, FIG. 26, and FIG. 27. PCLK uses FIG. 25, FIG. 26, and FIG. 27 as 8 dividing clock of VCLK.

FIG. 25 shows the operation of counter (1) 1231.

Suppose that the horizontal sync signal1 fell by a of FIG. 25. Counter (1) 1231 is reset at this time. PCLK begins (b of FIG. 25) to be outputted after the fixed VCLK number (7 VCLKs) which exists on the basis of falling of the horizontal sync signal1.

When the horizontal sync signal1 is "H" of VCLK, it falls at this time, the horizontal sync signal1 of PCLK is "L" of VCLK synchronizing with rising of VCLK and it falls, PCLK is outputted synchronizing with falling of VCLK.

Counter (1) 1231 performs count operation by this PCLK. And the value of the counter when the horizontal sync signal2 falls (c of FIG. 25) is held, and it outputs to the detection data creation circuit 1234.

FIG. 26 shows the operation of counter (2) 1232 and counter (3) 1233 when PCLK is synchronized with rising of VCLK.

Counter (2) 1232 and counter (3) 1233 count having in rising of PCLK and being reset at the timing of a and b of FIG. 26. And if the horizontal sync signal2 falls, the count value at that time will be held, and it outputs to the detection data creation circuit 1234.

FIG. 27 shows the operation of the counter (2) 1232 and the counter (3) 1233 when PCLK is synchronized with falling of VCLK.

Counter (2) 1232 and counter (3) 1233 count having in rising of PCLK and being reset at the timing of a and b of FIG. 27. And if the horizontal sync signal2 falls, the count value at that time will be held, and it outputs to the detection data creation circuit 1234.

Next, the operation of the detection data creation circuit 1234 will be explained.

In the detection data creation circuit 1234, it creates as follows in the half-clock unit of VCLK first from the value of the count (2) of counter (2) 1232 and counter (3) 1233, and the count (3) used as the interval (d of FIG. 26, d of FIG. 27) from rising of PCLK to falling of the horizontal sync signal2.

(i) in the case of counter (2)>counter (3) (it is considered that the zero value of the counter (2) is 8), the interval data=2× count (2);

(ii) in the case of count (2)<counter (3) (it is considered that the zero value of the counter (3) is 8), the interval data=2× count (3);

(iii) in the case of count (2)=count (3), the interval data=2× count (2)+1.

Since the PCLK is a clock having a period that is 8 times the period of VCLK, the detection data is determined by the formula: the detection data=counter (1)×16+interval data.

As mentioned above, according to the composition of FIG. 24, the interval of falling of the horizontal sync signal2 can be created from falling of the horizontal sync signal1 with easier composition with the number of the clocks in ½ clock steps of VCLK.

Figure 28:
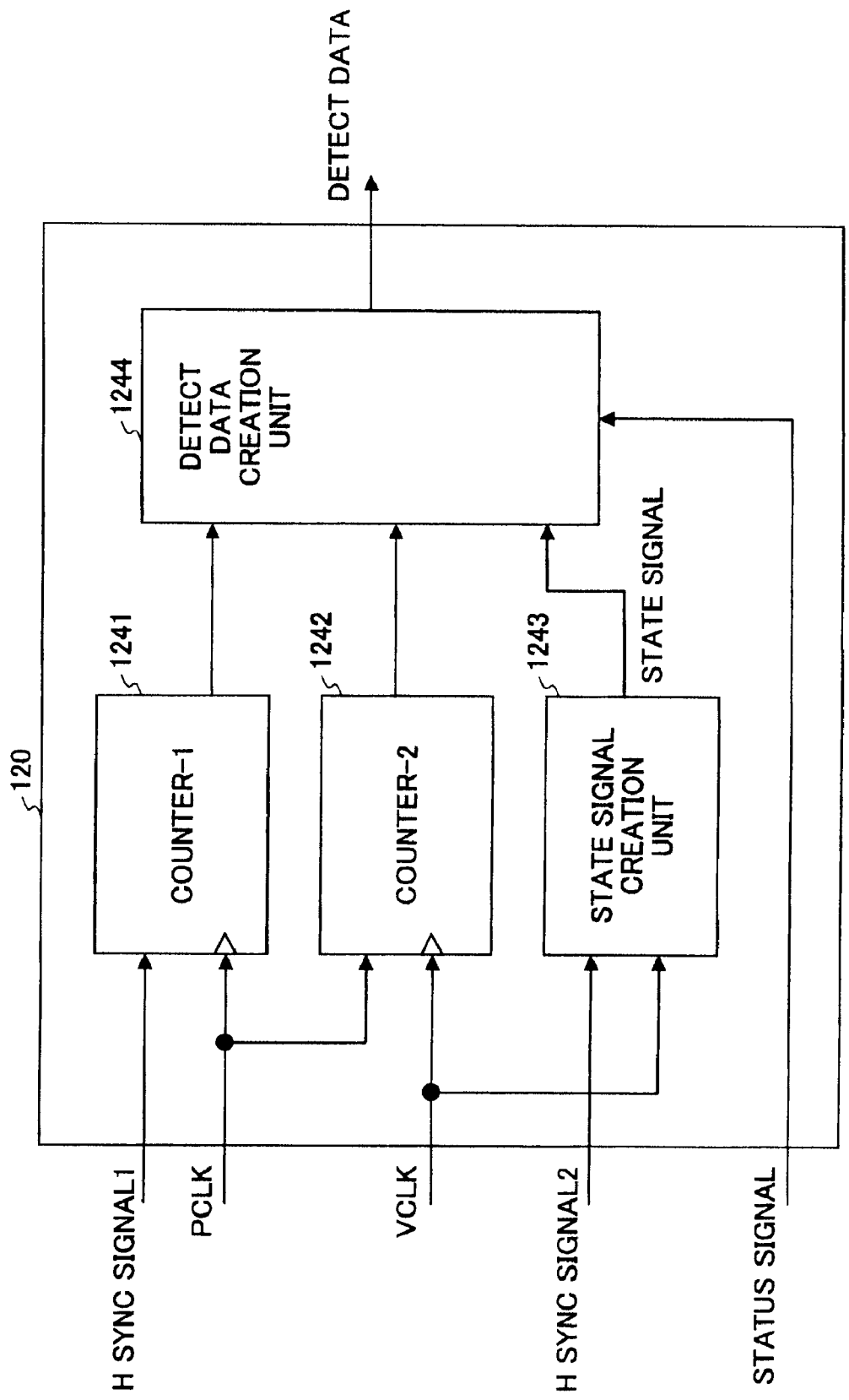
FIG. 28 is a block diagram of a fourth embodiment of the detection unit in FIG. 2.

The counter operated with the high frequency clock by measuring scanning time combining the high frequency clock and the pixel clock in detail consumption current can be lessened by being able to lessen the number and operating the counter with the pixel clock of frequency lower than the high frequency clock FIG. 28 is a block diagram of the fourth embodiment of the detection unit 120 in FIG. 2. In FIG. 28, the counter (1) 1241 and the counter (2) 1242 are the same as the corresponding elements in the third embodiment of FIG. 24.

Moreover, the state signal creation circuit 1243 is the same as what is shown in the second embodiment of FIG. 19, and creates the state signal which shows the state of VCLK when the horizontal sync signal2 falls.

The status signal is inputted into the detection data creation circuit 1244 from the status signal creation circuit 1590 of the pixel clock creation circuit 150 which PCLK is the signal which shows whether it synchronizes with rising of VCLK, or it synchronizes with falling as showed in FIG. 4.

In the detection data creation circuit 1244, detection data is created as follows from the count (1), the count (2), the state signal, and the status signal. In this embodiment, PCLK is a clock having a period that is 8 times the period of the VCLK.

Moreover, the state signal is "H" when the horizontal sync signal2 falls in the state of "H" of VCLK, and when it falls in the state of "L" of VCLK, it is set to "L".

The status signal is set to "H" when PCLK is synchronized with rising of VCLK, and it is set to "L" when synchronized with falling of VCLK.

(i) in the case of state signal="H" and status signal="H", the detection data=count (1)×16+counter (2)×2;

(ii) in the case of state signal="L" and status signal="H", the detection data=count (1)×16+counter (2)×2+1;

(iii) in the case of state signal="H" and status signal="L", the detection data=count (1)×16+(counter (2)+1)×2;

(iv) in the case of state signal="L" and status signal="L" the detection data=count (1)×16+(counter (2)+1)×2−1.

Figure 29:
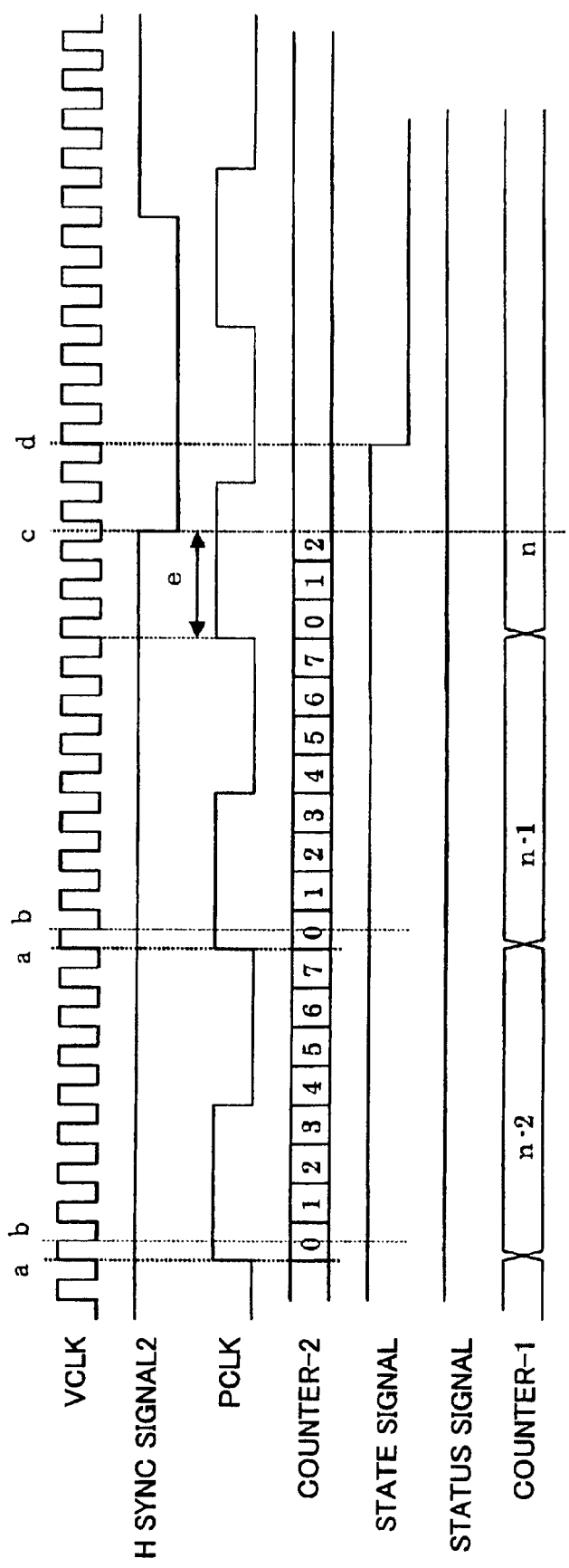
FIG. 29 is a timing diagram for explaining the operation of the detection unit of FIG. 28.

The situation of each signal when the horizontal sync signal2 falls is shown in FIG. 29. Here, the PCLK is synchronized with rising of VCLK, therefore the status signal becomes "H".

The horizontal sync signal2 is the timing of c of FIG. 29, when VCLK is in the state of "L", it falls, and therefore the state signal of the state signal creation circuit 1243 becomes "L" at the timing of d of FIG. 29.

Moreover, the value of counter (2) 1242 when the horizontal sync signal2 falls is "2", and the interval (e of FIG. 29) to falling of the horizontal sync signal2 is set to 2×2+1=5 from rising of PCLK.

And since the value of the counter (1) when the horizontal sync signal2 falls is n, detection data is set to 16×(n+5).

As mentioned above, according to the composition of FIG. 28, the interval of falling of the horizontal sync signal2 can be created from falling of the horizontal sync signal1 with easier composition with the number of the clocks in ½ clock steps of VCLK.

The counter operated with the high frequency clock by measuring scanning time combining the high frequency clock and the pixel clock in detail, the number of the counters which can lessen the number and are operated with the high frequency clock can be reduced, and consumption current can be lessened by operating the counter with the pixel clock of frequency still lower than the high frequency clock.

As explained above, it sets to the pixel clock creation device 100 of the first embodiment of FIG. 2. The interval (detection data) of the horizontal sync signal1 and the horizontal sync signal2 is created by the detection unit 120. The predetermined target value and this detection data are compared by the comparison result creation circuit 130, so that the amount of deviation is calculated.

By creating the phase data for correcting the deviation from the amount of deviations in the phase data creation circuit 140, and giving this phase data to the pixel clock creation circuit 150, the period of the pixel clock PLK can be adjusted and the position deviation of the dot can be corrected with high precision.

A description will be given the second preferred embodiment of the invention.

Figure 30:
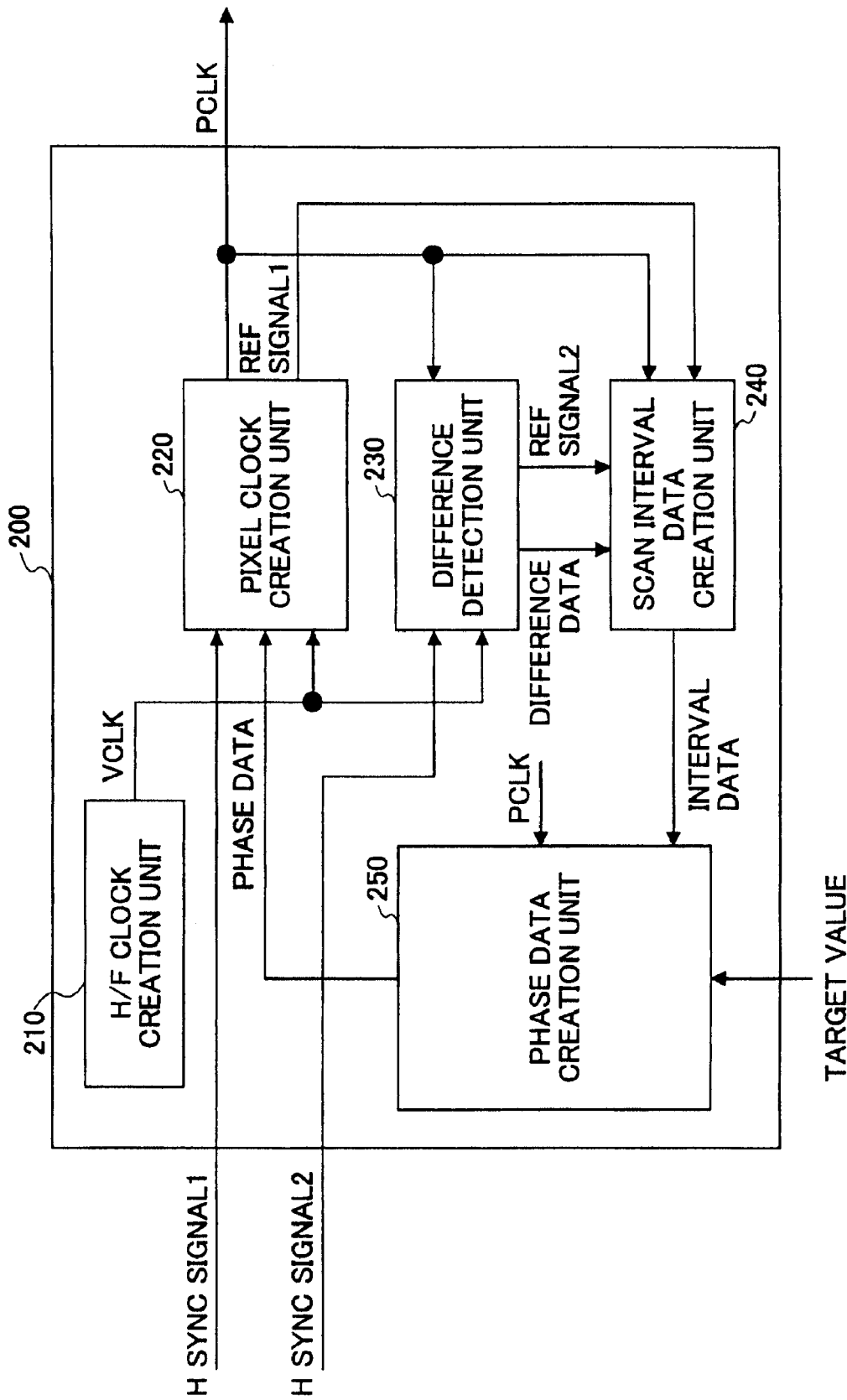
FIG. 30 is a block diagram of the composition of the pixel clock creation device in the second preferred embodiment of the invention.

FIG. 30 is a block diagram of the pixel clock creation device in the second preferred embodiment of the invention.

In FIG. 30, the pixel clock creation device 200 comprises the high frequency clock creation circuit 210, the pixel clock creation circuit 220, the difference detection unit 230, the scanning interval data creation circuit 240, and the phase data creation circuit 250.

The high frequency clock creation circuit 210 creates the high frequency clock VCLK used as the standard of the pixel clock PCLK like the first previous embodiment.

In the pixel clock creation circuit 220, the pixel clock PCLK and the first reference signal 1 are created from the high frequency clock VCLK, the first horizontal sync signal1, and phase data. That is, the pixel clock creation circuit 220 is equipped with the first reference-signal creation unit with the pixel clock creation unit.

Figure 31:
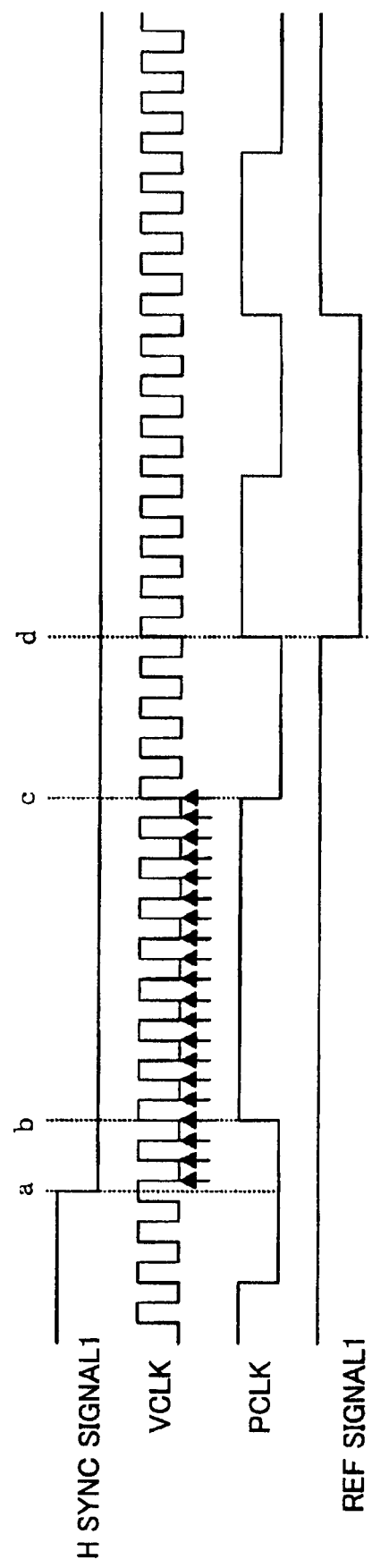
FIG. 31 is a timing diagram for explaining the operation of the pixel clock creation circuit in FIG. 30.

FIG. 31 shows the relation between the high frequency clock VCLK, the horizontal sync signal1, the pixel clock PCLK and the reference signal 1.

In this embodiment, the pixel clock PCLK is a clock having a period that is 8 times the period of the high frequency clock VCLK. In falling (a of FIG. 31) of the horizontal sync signal 1, the pixel clock PCLK is in the state of "H" fixation temporarily (b of FIG. 31).

And after the horizontal sync signal falls, the pixel clock PCLK is set to "L" and the clock begins to be outputted again in the position (c of FIG. 31) of transition of the VCLK at a certain set-up number of times (in this case, 20 times).

Thereby, the interval of a and c of FIG. 31 becomes fixed in the accuracy of the VCLK semicircle term.

Moreover, by outputting the reference signal 1 as shown, for example in FIG. 31 at the timing of d can show the start of the scanning line.

Figure 32:
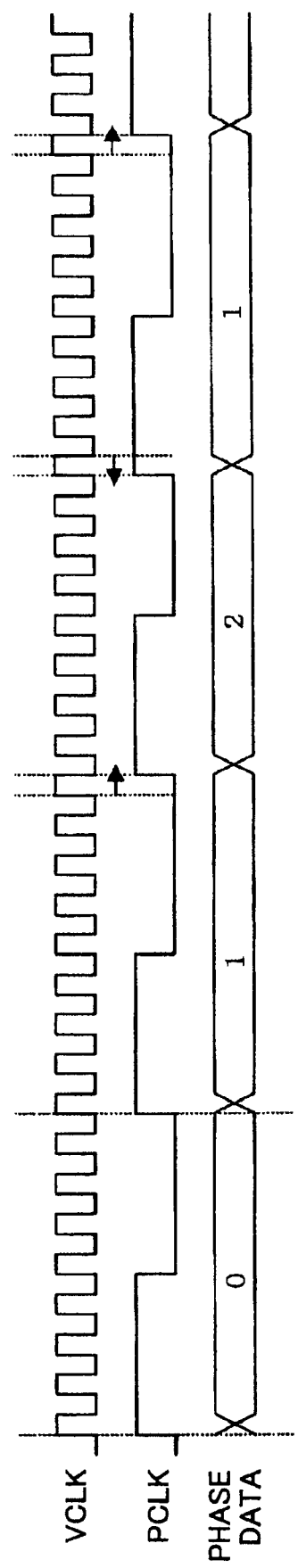
FIG. 32 is a timing diagram for explaining the operation of the pixel clock creation circuit in FIG. 30.

Furthermore, in the pixel clock creation circuit 220, for every period, the period of the pixel clock PCLK is lengthened or shortened according to the phase data, and such pixel clock PCLK is outputted. FIG. 32 shows an example of the relation between the phase data and the pixel clock PCLK in the following situation:

In the case of the phase data="0", the period of PCLK is 8 times the period of VCLK;

In the case of the phase data="1", the period of PCLK is (8+½) times the period of VCLK;

In the case of the phase data="2", the period of PCLK is (8−½) times the period of VCLK.

The difference detection unit 230 creates the second reference signal 2 for the pixel clock PCLK when the difference data and horizontal sync signal2 which show the interval of rising of the high frequency clock VCLK, the second horizontal sync signal2, and the pixel clock PCLK to the pixel clock PCLK and falling of the horizontal sync signal2 at the VCLK step or the semicircle term step of VCLK fall being shown.

Figure 33:
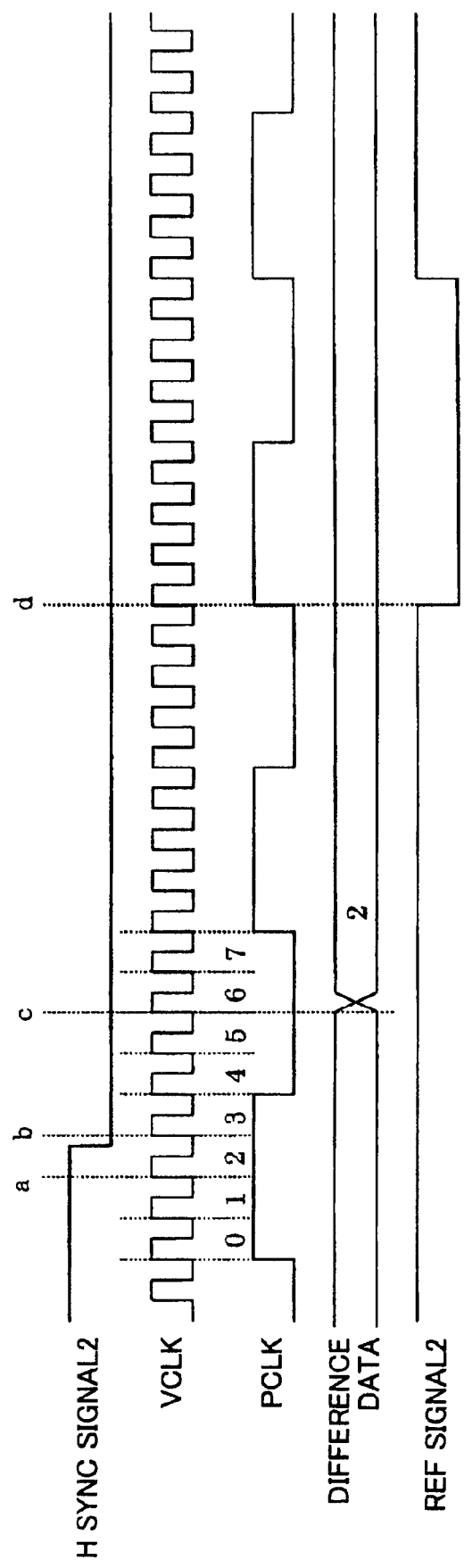
FIG. 33 is a timing diagram for explaining the operation of the difference detection unit in FIG. 30.

FIG. 33 shows the relation between the high frequency clock VCLK, the horizontal sync signal2, the pixel clock PCLK, the difference data, and the reference signal 2.

In the case of FIG. 33, the difference data is detected in the accuracy of the VCLK steps.

The one period of the pixel clock PCLK is divided at the VCLK step, the data is matched with each section (here, 0-7 are matched), and the data of the section where the horizontal sync signal2 fell is outputted as a difference data.

In FIG. 33, since the horizontal sync signal2 falls at the timing of a, the data "2" has a certain delay from falling of the second horizontal sync signal, and it is outputted as a difference data (c of FIG. 33).

Moreover, by creating the reference signal 2 as shown in FIG. 33 in rising (d of FIG. 33) of 2 clock eye from the pixel clock PCLK with which the horizontal sync signal2 fell shows that it is the pixel clock PCLK in front of two that the horizontal sync signal2 fell.

In addition, the composition of the difference detection unit 230 will be explained later.

The scanning interval data creation circuit 240 creates the interval data (time interval) of the horizontal sync signal1 and the horizontal sync signal2 from the pixel clock PCLK, the reference signal 1, the reference signal 2, and the difference data.

Figure 34:
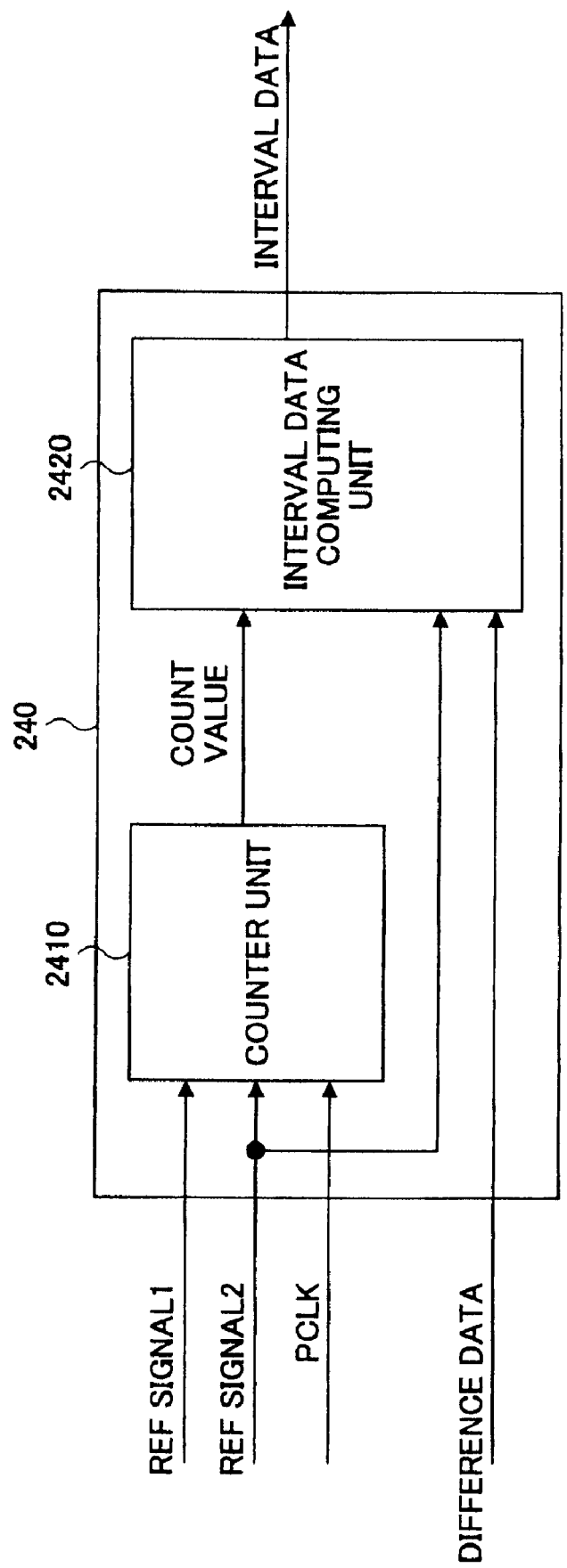
FIG. 34 is a block diagram of an embodiment of the scanning interval data creation circuit in FIG. 30.
Figure 35:
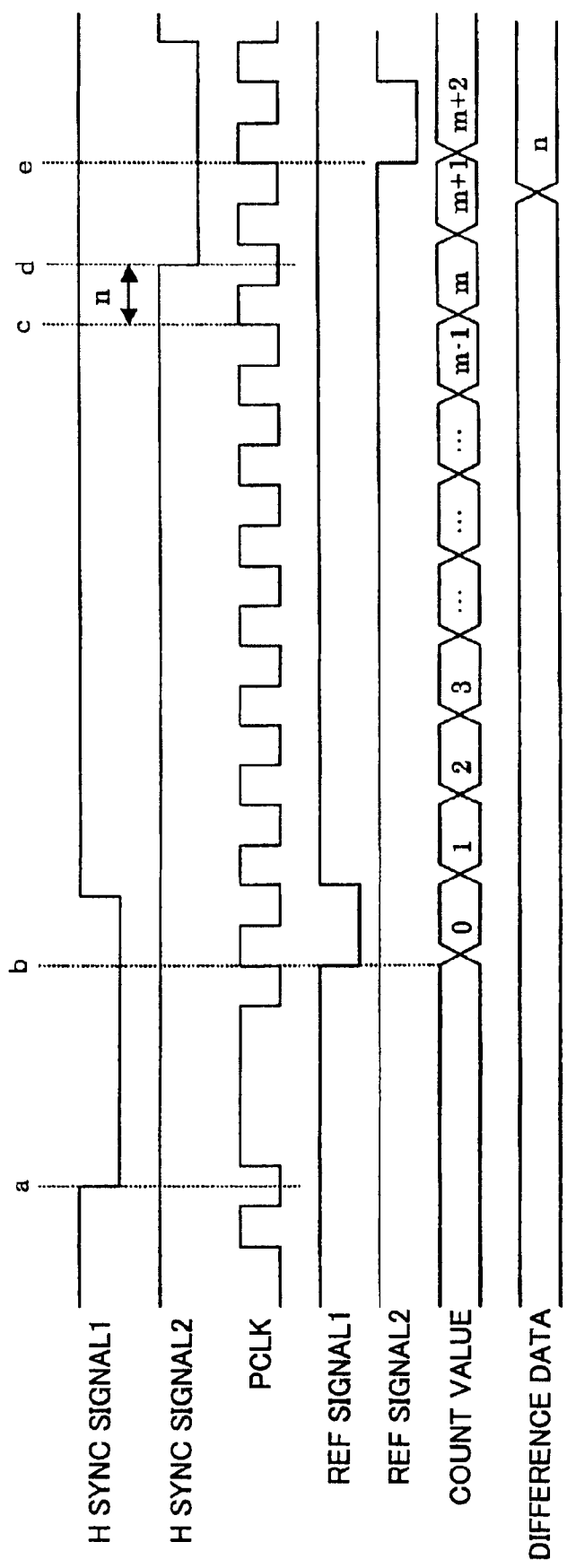
FIG. 35 is a timing diagram for explaining the operation of the scanning interval data creation circuit of FIG. 34.

FIG. 35 shows an example of the composition of the scanning interval data creation circuit in FIG. 34 with the situation of the respective signals.

In FIG. 34, the counting operation is carried out with the pixel clock PCLK, the reference signal 1 resets the count value to 0 by "L" (b of FIG. 35), and the counter section 2410 stops count operation in the place where the reference signal 2 became "L", and holds the count value at that time (e of FIG. 35).

In the interval data calculation section 2420, the interval data of b to d of FIG. 35 is calculated from the count value of the counter section 2410, and the difference data in the place where the reference signal 2 becomes "L".

When the difference data is detected by the VCLK steps, the scanning interval data is represented by the following formulas:

interval data=count value×8+difference data.

When the difference data is detected by the halves of the VCLK steps, the scanning interval data is represented by the following formulas:

interval data=count value×16+difference data.

Actually, the interval of a and d of FIG. 35. However, the pixel clock PCLK with the interval of a and b is created by the pixel clock creation circuit 220 synchronized with the horizontal sync signal1, and it is fixed in every scanning line, it is adequate that just the interval of b and d of FIG. 35 is created.

The phase data creation circuit 250 compares the interval data with the predetermined target value, and creates phase data based on the difference between the interval data and the target value. For example, when the interval data is detected in halves of the VCLK steps and larger than the target value by "4", the phase data "1" is given to any four pixel clocks PCLK between the interval of b and d of FIG. 35 in the next scanning cycle.

In this way, the period of each of the four pixel clocks PCLK is extended by half the period of the VCLK, and the interval of b and d in FIG. 35 is in agreement with the target value.

And the dots in the same number can be created between the horizontal sync signal1 and the horizontal sync signal2, and the position deviation of the dots can be eliminated.

Conversely, when the interval data is smaller than the target value, the phase data "2" is given to the pixel clocks PCLK, and the period of the pixel clock PCLK is shortened.

Therefore, based on the pixel clock PCLK, the reference signals 1 and 2, and the difference data, the scanning interval data creation circuit 240 creates the scanning interval data between the horizontal sync signal1 and the horizontal sync signal2.

By comparing the interval data and the predetermined target value, the phase data creation circuit 250 calculates the amount of deviation. The phase data creation circuit 250 creates the phase data for correcting the deviation based on the amount of deviation, and gives the phase data to the pixel clock creation circuit 220.

The period of the pixel clock PCLK is adjusted and the position deviation of the dots is corrected.

Figure 36:
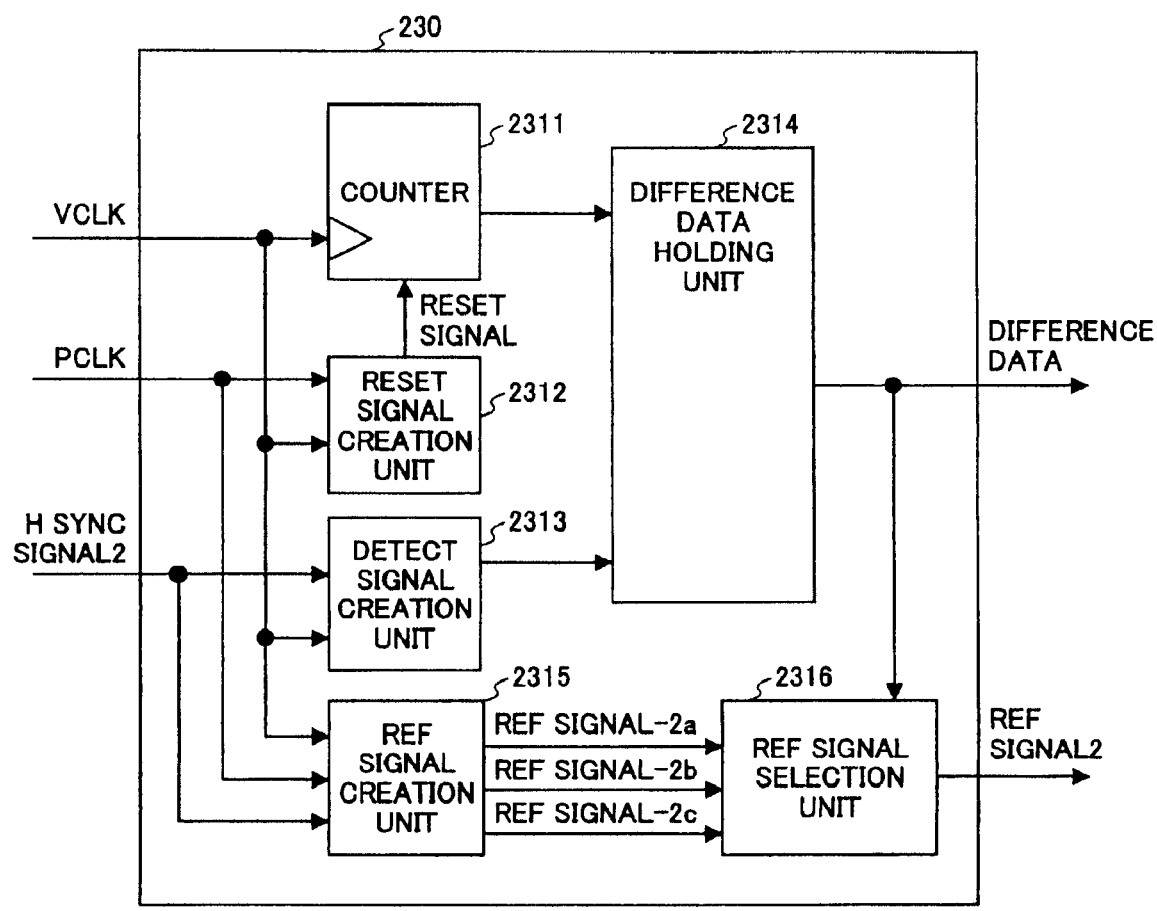
FIG. 36 is a block diagram of a first embodiment of the difference detection unit in FIG. 30.

FIG. 36 is a block diagram of the first embodiment of the difference detection unit 230 of FIG. 30.

The difference detection unit 230 comprises the counter 2311, the reset signal creation circuit 2312, the detected signal creation circuit 2313, the difference data holding circuit 2314, the reference-signal creation circuit 2315, and the reference-signal selection circuit 2316.

Figure 37:
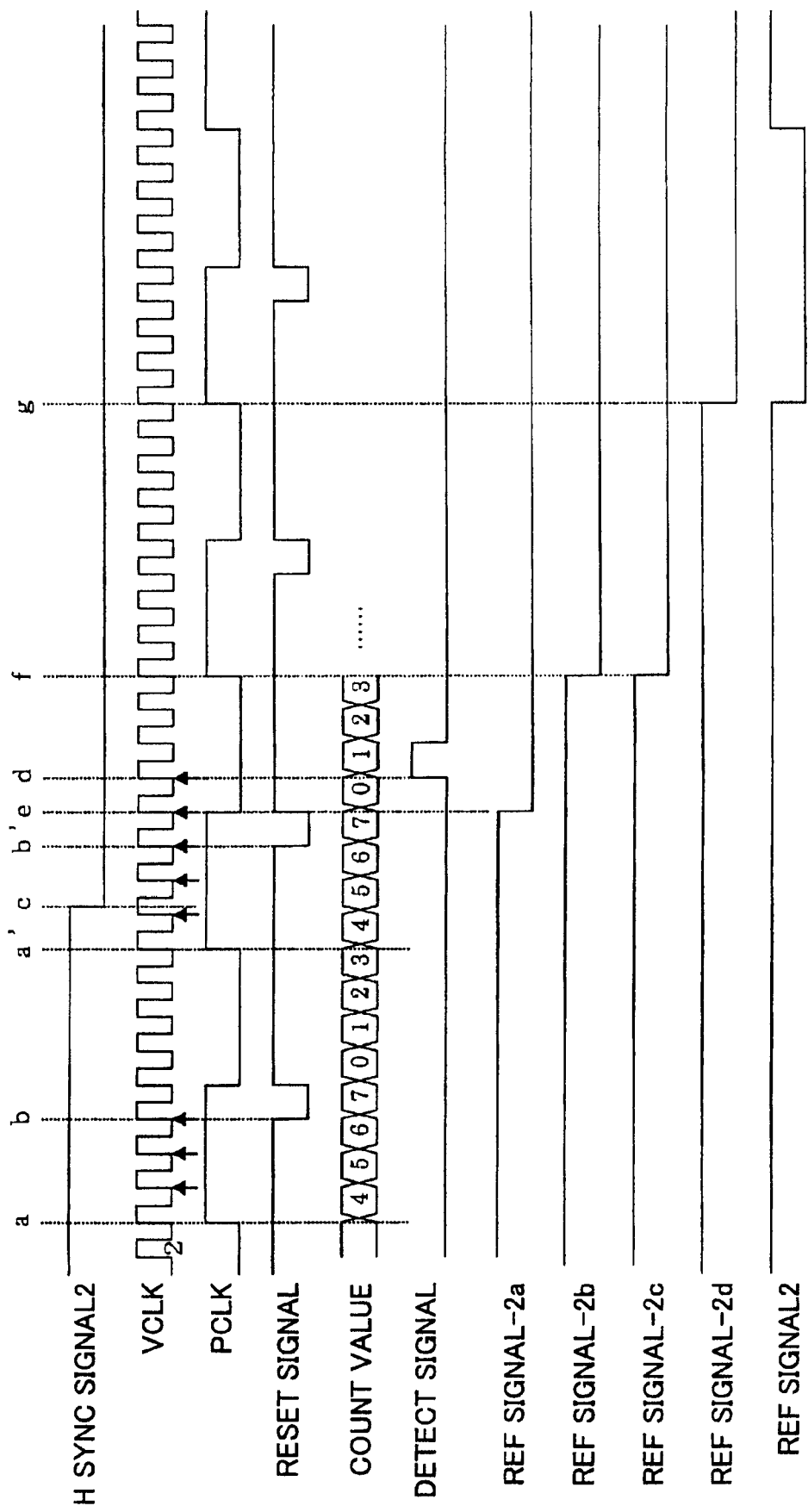
FIG. 37 is a timing diagram for explaining the operation of the difference detection unit of FIG. 36.

FIG. 37 is a timing diagram for explaining the operation of the difference detection unit 230 in this embodiment.

The counter 2311 is the counter which operates in rising of VCLK, and is reset according to the reset signal outputted from the reset signal creation circuit 2312.

The reset signal creation circuit 2312 detects the rising (a, a' of FIG. 37) of the pixel clock PCLK, creates the reset signal in rising (b, b' of FIG. 37) of the third VCLK from there, and outputs it to the counter as shown in FIG. 37.

This is performed for every pixel clock and the counter is reset for every pixel clock.

In the detected signal creation circuit 2313, the falling (c of FIG. 37) of the horizontal sync signal2 is detected, and the detected signal in rising (d of FIG. 37) of the fourth VCLK from the falling is created as shown in FIG. 37.

The difference data holding circuit 2314 holds the counter value of the counter 2311 in case the detected signal is "H" (in the case of FIG. 37, "1"), and outputs it as a difference data.

The reference-signal creation circuit 2315 creates the reference signal-2a, the reference signal-2b, and the reference signal-2c based on the VCLK, the pixel clock PCLK, and the horizontal sync signal2.

As shown in FIG. 37, the reference signal-2a is the signal (e of FIG. 37) in which the phase of the horizontal sync signals 2 is shifted by three VCLKs, the reference signal-2b is the signal (f of FIG. 37) in which the reference-signal 2a is latched with the pixel clock PCLK, and the reference signal-2c is the signal (f of FIG. 37) in which the horizontal sync signal2 is latched with the pixel clock PCLK.

In the reference-signal selection circuit 2316, one of the reference signal-2a, the reference signal-2b and the reference signal 2c is selected based on the difference data, the state signal 1, and the state signal 2, the selected signal is latched with the pixel clock PCLK, and the reference signal 2 is created based on the latched signal (2d of reference signals of FIG. 37).

The selection conditions for selecting one of reference signal-2a, reference signal-2b, and reference signal-2c are as follows.

The reference signal-2a is selected in the case of one of the following:

the difference data is "6" or "7" (the state signal 1 and the state signal 2 are the "do not care" ones); and the difference data is "0", the state signal1 is "H", and the state signal2 is "L".

The reference signal-2b is selected in the case of one of the following:

the difference data is "0" and the state signal1="L" (the state signal2 is the "do not care" one); and the difference data is "0", the state signal1="H" and the state signal2="H"; and the difference data is "1" (the state signal 1 and the state signal 2 are the "do not care" ones).

The reference signal-2c is selected in the case of the following:

the difference data is any of "2", "3", "4" and "5" (the state signal 1 and the state signal 2 are the "do not care" ones).

In FIG. 37, the reference signal-2b is selected and latched (g of FIG. 37), so that the reference signal 2 is outputted.

As mentioned above, according to the composition of FIG. 36, even if it can create the difference data which indicates the scanning interval between the falling of the horizontal sync signal2 and the rising of the pixel clock PCLK in the accuracy of the VCLK steps. Even when the falling of the horizontal sync signal2 arises near the rising of the pixel clock PCLK, the reference signal 2 can be created with high accuracy.

In addition, the operation in rising of VCLK has been explained with FIG. 37. However, it is possible that falling of VCLK may be used instead, according to the present invention.

Figure 38:
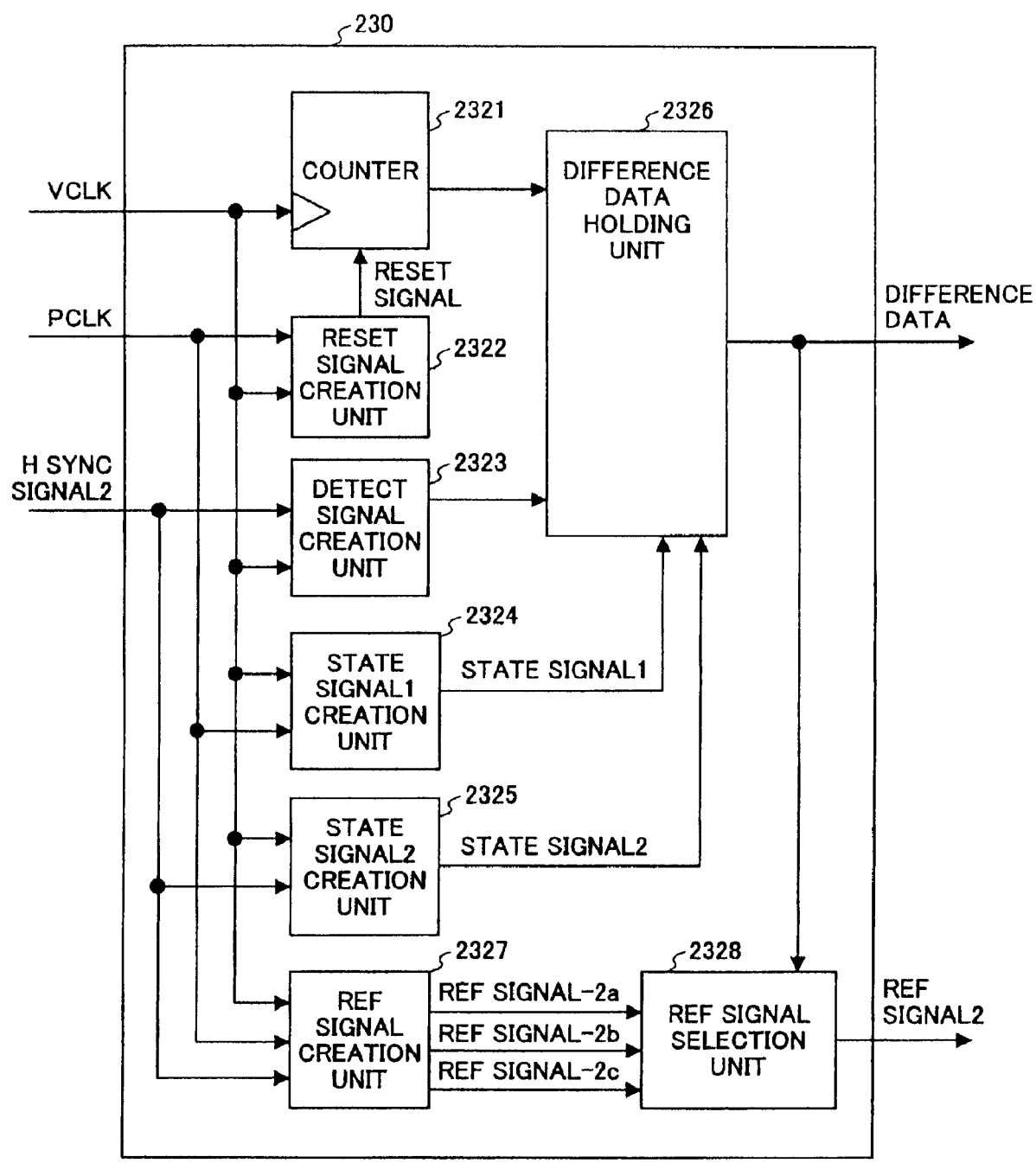
FIG. 38 is a block diagram of a second embodiment of the difference detection unit in FIG. 30.

FIG. 38 is a block diagram of the second embodiment of the difference detection unit 230 in FIG. 30.

As shown in FIG. 38, the difference detection unit 230 comprises the counter 2321, the reset signal creation circuit 2322, the detected signal creation circuit 2323, the state signal 1 creation circuit 2324, the state signal 2 creation circuit 2325, the difference data holding circuit 2326, the reference-signal creation circuit 2327, and the reference-signal selection circuit 2328.

Figure 39:
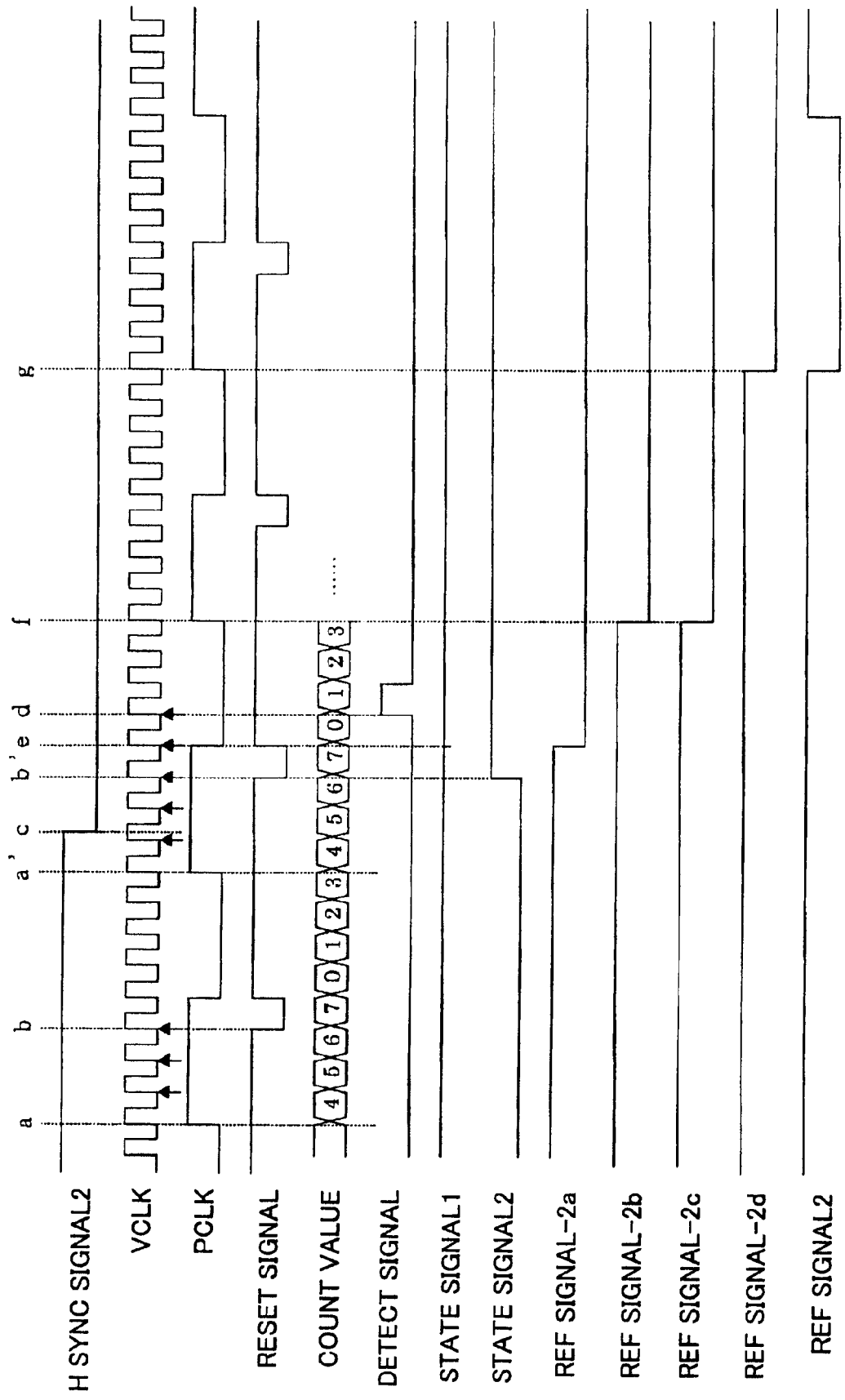
FIG. 39 is a timing diagram for explaining the operation of the difference detection unit of FIG. 38.
Figure 40:
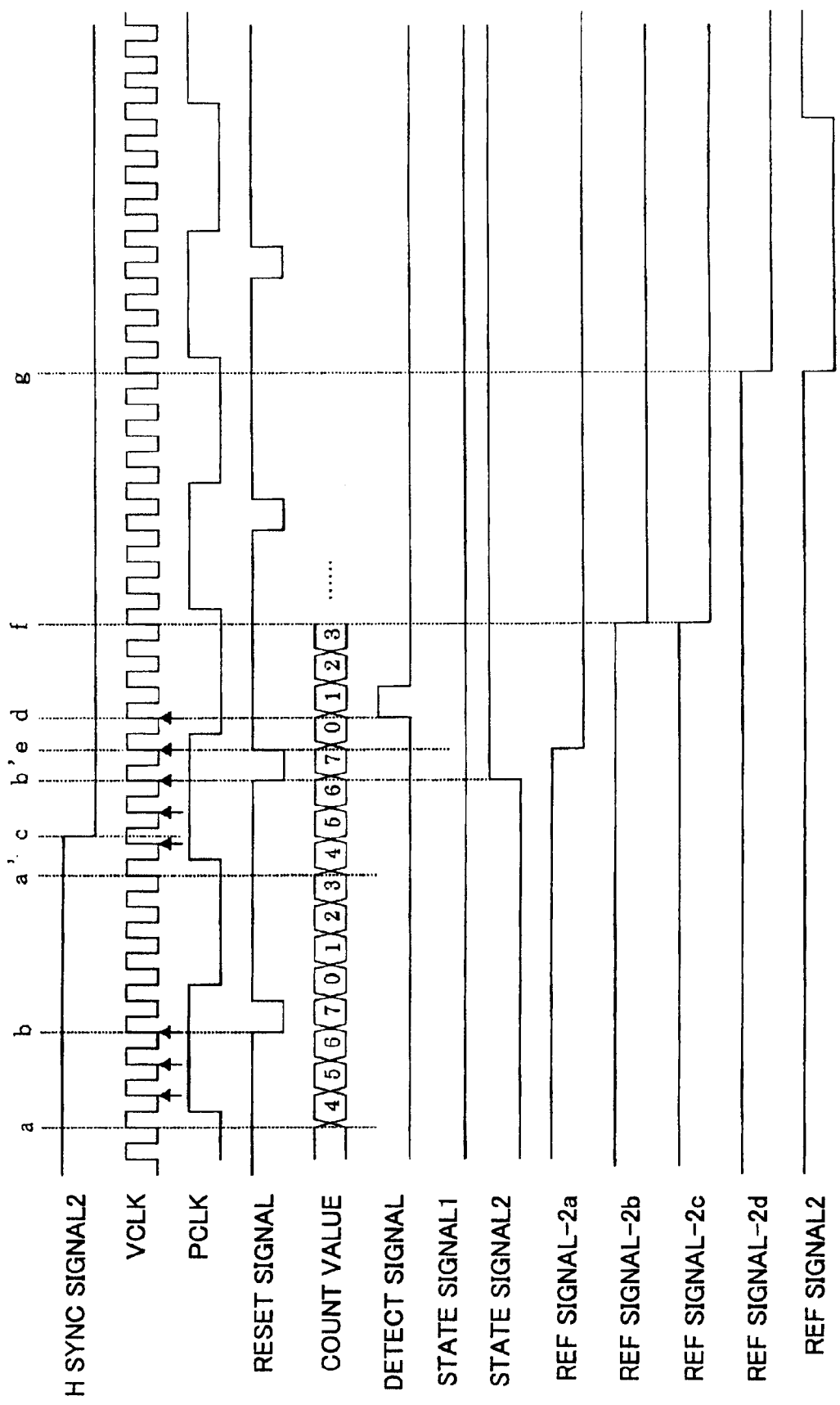
FIG. 40 is a timing diagram for explaining the operation of the difference detection unit of FIG. 38.

FIG. 39 and FIG. 40 are timing diagrams for explaining the operation of the difference detection unit 230 in the present embodiment.

In FIG. 38, the operation of the counter 2321, the reset signal creation circuit 2322, and the detected signal creation circuit 2323 is the same as that of the counter 2311, the reset signal creation circuit 2312, and the detected signal creation circuit 2313 in FIG. 35, and a description thereof will be omitted.

The state signal 1 creation circuit 2324 creates the state signal1 which indicates whether the pixel clock PCLK is synchronized with the falling of VCLK or with the rising of VCLK.

For example, the state signal 1 is set to "L" when synchronized with rising of VCLK, and when synchronized with falling of VCLK, it is set to "H".

In FIG. 39, since the pixel clock PCLK is synchronized with rising of VCLK, the state signal 1 is "H". In FIG. 40, since the pixel clock PCLK is synchronize with falling of VCLK, the state signal 1 is "L."

The state signal 2 of the signal which shows whether the state signal 2 creation circuit 2325 fell whether it fell when the horizontal sync signal2 was in the state of "H" of VCLK in the state of "L" of VCLK is created. For example, the case where it falls in the state of "H" of VCLK is set to "H", and the case where it falls in the state of "L" of VCLK is set to "L".

In FIG. 39 and FIG. 40, the horizontal sync signal2 falls in the state of "H" of VCLK (c of FIG. 39, c of FIG. 40), the state signal 2 is "H" from falling of the horizontal sync signal2 after a certain delay (b' of FIG. 39, and b of FIG. 40).

In the difference data holding circuit 2326, the detected signal holds and outputs in quest of the difference data from the counter value in "H", the state signal 1, and the state signal 2, as follows:

(i) in the case of the state signal1="L" and the state signal2="L", 2×the count value;

(ii) in the case of the state signal1="H" and the state signal2="H", 2×the count value;

(iii) in the case of the state signal1="H" and the state signal2="L", 2×the count value+1;

(iv) in the case of the state signal1="L" and the state signal2="H", 2×the count value−1.

In the example of FIG. 39, the state signal1="H", the state signal2="H", and the count value is "1", and therefore the difference data is set to "2". In the example of FIG. 40, the state signal1="L", the state signal2="H", and the count value is "1", and therefore the difference data is set to "1".

The operation of the reference-signal creation circuit 2327 and the reference-signal selection circuit 2328 is the same as that of the corresponding elements in FIG. 36. The reference signal-2a, the reference signal-2b, and the reference signal-2c are created, one of these signals is selected based on the difference data. The selected signal is latched by the PCLK, and the reference signal 2 is created from the latched signal (the reference signal 2d) and outputted.

The selection conditions of reference-signal 2a, reference-signal 2b, and reference-signal 2c are as follows.

The selection conditions for selecting one of reference signal-2a, reference signal-2b, and reference signal-2c are as follows.

The reference signal-2a is selected in the case of one of the following:

the difference data is "6" or "7" (the state signal 1 and the state signal 2 are the "do not care" ones); and the difference data is "0", the state signal1 is "H", and the state signal2 is "L".

The reference signal-2b is selected in the case of one of the following:

the difference data is "0" and the state signal1="L" (the state signal2 is the "do not care" one); and the difference data is "0", the state signal1="H" and the state signal2="H"; and the difference data is "1" (the state signal 1 and the state signal 2 are the "do not care" ones).

The reference signal-2c is selected in the case of the following:

the difference data is any of "2", "3", "4" and "5" (the state signal 1 and the state signal 2 are the "do not care" ones).

As mentioned above, according to the composition of FIG. 38, even if it can create the difference data which is the interval of falling of the horizontal sync signal2 at the semi-circle term step of VCLK from the pixel clock PCLK standup and falling change of the horizontal sync signal2 arises near rising change of the pixel clock PCLK, the reference signal 2 can be created correctly.

In addition, although operation in rising of VCLK was explained in FIG. 39 and FIG. 40, even if it uses falling of VCLK, it is possible similarly.

A description will be given of the preferred embodiment of the invention.

Figure 41:
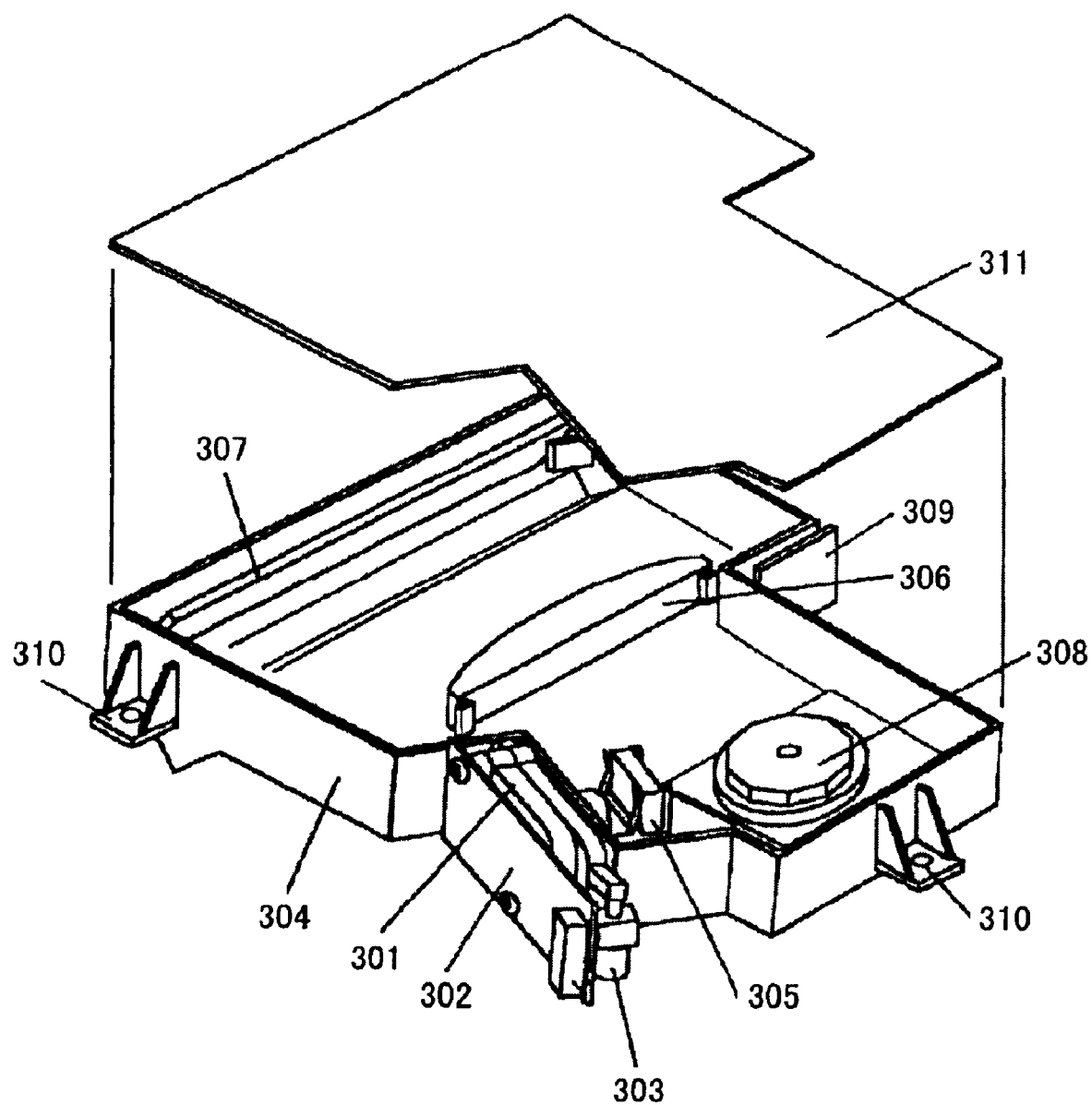
FIG. 41 is a perspective view of an embodiment of the optical scanning device in which the pixel clock creation device of the invention is provided.

FIG. 41 shows an example of the composition of the optical scanning device in which the pixel clock creation device of the invention is provided.

In FIG. 41, it is equipped with the printed circuit board 302 by which the drive circuit and pixel clock creation device which manage control of the semiconductor laser were formed in the back surface of the luminous source unit 301, is contacted by the surface of a wall of the optical housing 304 which intersects perpendicularly with the optical axis with the spring, and is united in inclination with the adjustment screw 303, and the posture is held.

In addition, the adjustment screw 303 is screwed in the projection section formed in the housing surface of a wall. The housing surface of a wall is equipped with the printed circuit board 309 which the cylinder lens 305, the polygon motor 308 turning around the polygon mirror, the ftheta lens 306, the toroidal lens, and the cuff mirror 307 are positioned respectively, and is supported, and mounts the synchronous detection sensor in the inside of optical housing from the outside like the luminous source unit.

The encapsulation of the upper part is carried out by the optical housing 304 and the cover 311, and screw fixation is carried out at the frame member of the image-forming-apparatus main part in two or more attachment sections 310 projected from the surface of a wall.

A description will be given of the fourth preferred embodiment of the invention.

Figure 42:
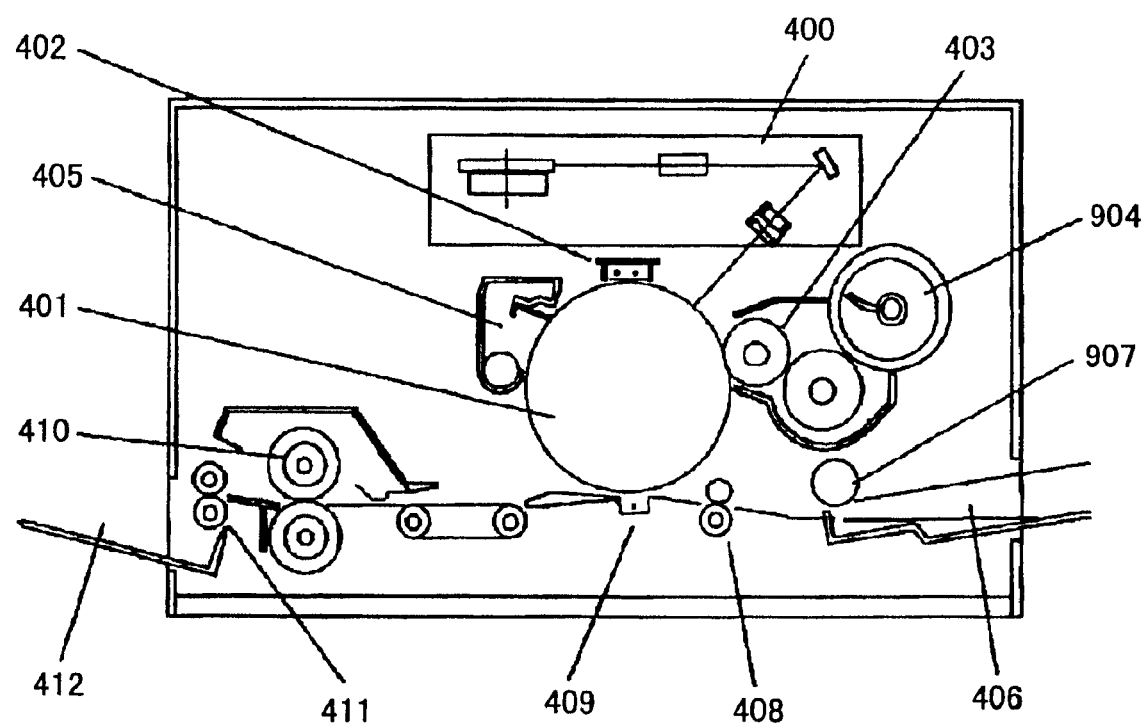
FIG. 42 is a cross-sectional view of an embodiment of the image forming apparatus in which the optical scanning device is provided.
Figure 43:
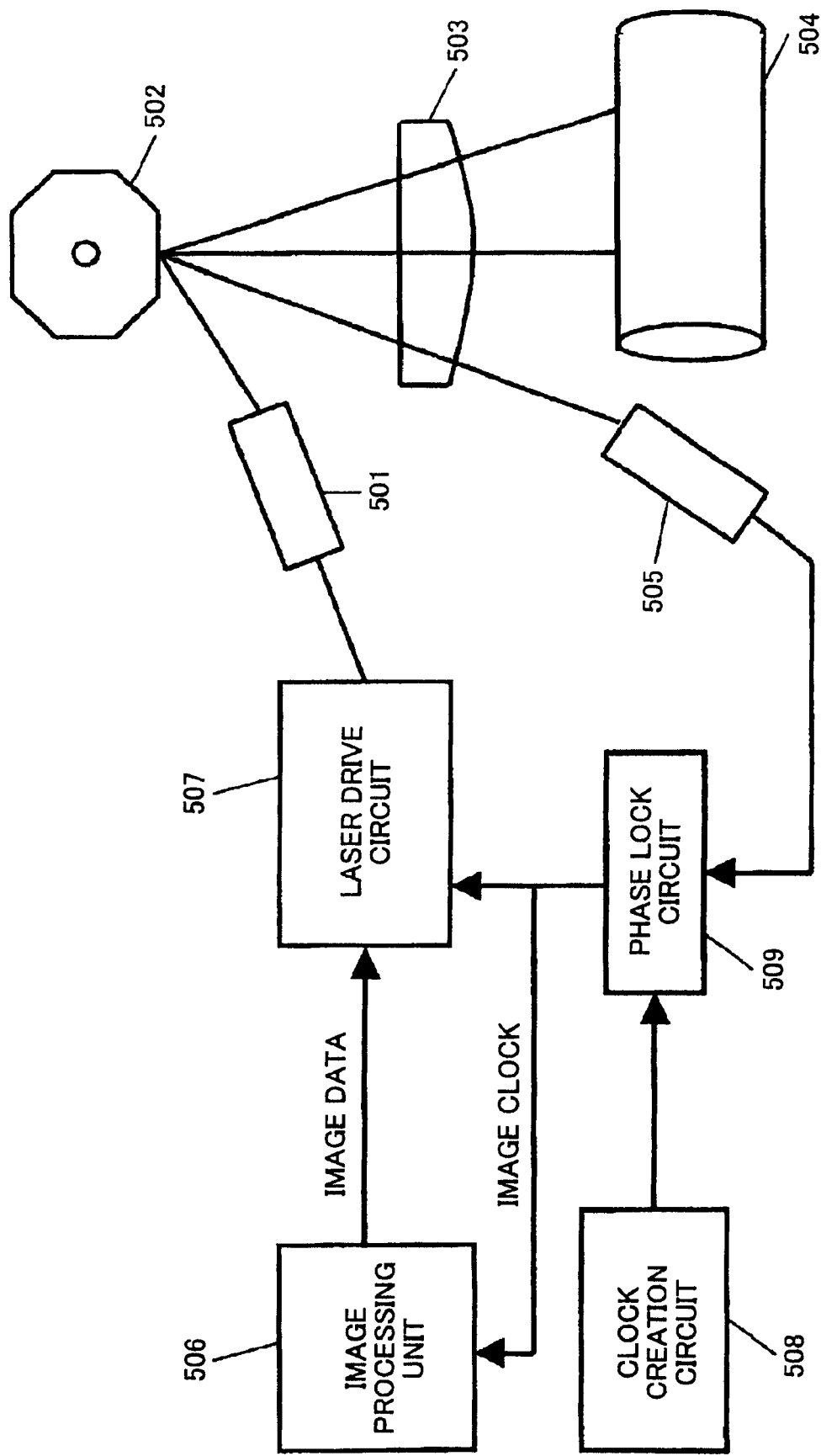
FIG. 43 is a block diagram showing the composition of a conventional image forming apparatus.

FIG. 42 shows an example of the composition of the image forming apparatus in which the optical scanning device of FIG. 41 is provided.

In FIG. 42, reference numeral 400 indicates the optical scanning device. The toner cartridge 404 which supplies the toner to the electrification charger 402 charged in the photoconductor around the photoconductor drum 401 which is the scanned medium at high pressure, the development roller 403 which adheres the charged toner to the electrostatic latent image recorded by the optical scanning device 400 to create the toner image, and the development roller, and the cleaning case 405 which scratches the toner which remained in the drum and stores it are arranged. The latent image recording of two or more lines is simultaneously performed for every page to the photoconductor drum 401. The recording paper is supplied by the feed roller 407 from the feed tray 406, the resist roller pair, and it is sent out by 408 according at the timing of the record start of the sub-scanning direction, when the photoconductor drum 401 is passed, the toner is transferred by the transfer charger 409, and it is established with the fixing roller 410, and is discharged by the ejection tray 412 with the ejection roller 411.

The present invention is not limited to the above-described embodiments, and variations and modifications may be made without departing from the scope of the present invention.

What is claimed is:

1. A pixel clock creation device, comprising:
a high frequency clock creation unit creating a high frequency clock;
a detection unit detecting a scanning time needed to scan a predetermined scanning length, in accuracy of half a period of the high frequency clock, and outputting a detection value indicating the detected scanning time, wherein the detection unit comprises:
a counter unit outputting a count value which is counted up in rising of the high frequency clock,
a first state detection unit detecting a state of the high frequency clock at a time of transition of a first horizontal sync signal indicating a time that a start point of the scanning length is scanned, the state of the high frequency clock being either high or low,
a second state detection unit detecting a state of the high frequency clock at a time of transition of a second horizontal sync signal indicating a time that an end point of the scanning length is scanned, the state of the high frequency clock being either high or low, and
a detection data creation unit creating the detection value based on the count value of the counter unit, a state signal outputted by the first state detection unit, and a state signal outputted by the second state detection unit;
a comparison result creation unit comparing the detection value and a predetermined target value, and outputting a comparison result;
a phase data creation unit creating a phase data based on the comparison result; and
a pixel clock creation unit creating a pixel clock whose phase is controlled based on both the high frequency clock and the phase data.

2. The pixel clock creation device according to claim 1, wherein, when the first state detection unit detects that the state of the high frequency clock at the time of transition of the first horizontal sync signal is high and the second state detection unit detects that the state of the high frequency clock at the time of transition of the second horizontal sync signal is high, then the detection data creation unit creates the detection value D according to the following equation:

$$D=2(n+1)$$

with n being the count value of the counter unit.

3. The pixel clock creation device according to claim 1, wherein, when the first state detection unit detects that the state of the high frequency clock at the time of transition of the first horizontal sync signal is low and the second state detection unit detects that the state of the high frequency clock at the time of transition of the second horizontal sync signal is low, then the detection data creation unit creates the detection value D according to the following equation:

$$D=2(n+1)$$

with n being the count value of the counter unit.

4. The pixel clock creation device according to claim 1, wherein, when the first state detection unit detects that the state of the high frequency clock at the time of transition of the first horizontal sync signal is high and the second state detection unit detects that the state of the high frequency clock at the time of transition of the second horizontal sync signal is low, then the detection data creation unit creates the detection value D according to the following equation:

$$D=2(n+1)+1$$

with n being the count value of the counter unit.

5. The pixel clock creation device according to claim 1, wherein, when the first state detection unit detects that the state of the high frequency clock at the time of transition of the first horizontal sync signal is low and the second state detection unit detects that the state of the high frequency clock at the time of transition of the second horizontal sync signal is high, then the detection data creation unit creates the detection value D according to the following equation:

$$D=2(n+1)-1$$

with n being the count value of the counter unit.

6. An optical scanning device in which a pixel clock creation device is provided, the optical scanning device comprising:
   a light source; and
   a deflector deflecting a light beam emitted by the light source, to scan a scanned surface of a photoconductor in a scanning direction,
   the pixel clock creation device comprising:
   a high frequency clock creation unit creating a high frequency clock;
      a detection unit detecting a scanning time needed to scan a predetermined scanning length, in accuracy of half a period of the high frequency clock, and outputting a detection value indicating the detected scanning time, wherein the detection unit comprises:
      a counter unit outputting a count value which is counted up in rising of the high frequency clock,
      a first state detection unit detecting a state of the high frequency clock at a time of transition of a first horizontal sync signal indicating a time that a start point of the scanning length is scanned, the state of the high frequency clock being either high or low,
      a second state detection unit detecting a state of the high frequency clock at a time of transition of a second horizontal sync signal indicating a time that an end point of the scanning length is scanned, the state of the high frequency clock being either high or low, and
      a detection data creation unit creating the detection value based on the count value of the counter unit, a state signal outputted by the first state detection unit, and a state signal outputted by the second state detection unit;
   a comparison result creation unit comparing the detection value and a predetermined target value, and outputting a comparison result;
   a phase data creation unit creating a phase data based on the comparison result; and
   a pixel clock creation unit creating a pixel clock whose phase is controlled based on both the high frequency clock and the phase data.

7. An image forming apparatus in which an optical scanning device is provided, the image forming apparatus comprising a photoconductor and performing image formation using the optical scanning device as an exposure unit of the photoconductor, the optical scanning device comprising:
   a light source; and
   a deflector deflecting a light beam emitted by the light source, to scan a scanned surface of the photoconductor in a scanning direction,
   the pixel clock creation device comprising:
   a high frequency clock creation unit creating a high frequency clock;
   a detection unit detecting a scanning time needed to scan a predetermined scanning length, in accuracy of half a period of the high frequency clock, and outputting a detection value indicating the detected scanning time, wherein the detection unit comprises:
      a counter unit outputting a count value which is counted up in rising of the high frequency clock,
      a first state detection unit detecting a state of the high frequency clock at a time of transition of a first horizontal sync signal indicating a time that a start point of the scanning length is scanned, the state of the high frequency clock being either high or low,
      a second state detection unit detecting a state of the high frequency clock at a time of transition of a second horizontal sync signal indicating a time that an end point of the scanning length is scanned, the state of the high frequency clock being either high or low, and
      a detection data creation unit creating the detection value based on the count value of the counter unit, a state signal outputted by the first state detection unit, and a state signal outputted by the second state detection unit;
   a comparison result creation unit comparing the detection value and a predetermined target value, and outputting a comparison result;
   a phase data creation unit creating a phase data based on the comparison result; and
   a pixel clock creation unit creating a pixel clock whose phase is controlled based on both the high frequency clock and the phase data.

8. A pixel clock creation method, comprising:
   creating a high frequency clock;
   detecting a scanning time needed to scan a predetermined scanning length, in accuracy of half a period of the high frequency clock to output a detection value indicating the detected scanning time, wherein the detecting comprises:
      outputting a count value which is counted up in rising of the high frequency clock,
      detecting a state of the high frequency clock at a time of transition of a first horizontal sync signal indicating a time that a start point of the scanning length is scanned, to output a first state signal indicating said detected state, the state of the high frequency clock being either high or low, detecting a state of the high frequency clock at a time of transition of a second horizontal sync signal indicating a time that an end point of the scanning length is scanned, to output a second state signal indicating said detected state, the state of the high frequency clock being either high or low, and creating the detection value based on the count value, the first state signal and the second state signal;

comparing the detection value and a predetermined target value to output a comparison result;

creating a phase data based on the comparison result; and creating a pixel clock whose phase is controlled based on both the high frequency clock and the phase data.

9. The pixel clock creation method according to claim 8, wherein, when the detecting the state of the high frequency clock at the time of transition of the first horizontal sync signal detects that the state of the high frequency clock at the time of transition of the first horizontal sync signal is high and the detecting the state of the high frequency clock at the time of transition of the second horizontal sync signal detects that the state of the high frequency clock at the time of transition of the second horizontal sync signal is high, then the detection data creation unit creates the detection value D according to the following equation:

$$D=2(n+1)$$

with n being the count value of the counter unit.

10. The pixel clock creation method according to claim 8, wherein, when the detecting the state of the high frequency clock at the time of transition of the first horizontal sync signal detects that the state of the high frequency clock at the time of transition of the first horizontal sync signal is low and the detecting the state of the high frequency clock at the time of transition of the second horizontal sync signal detects that the state of the high frequency clock at the time of transition of the second horizontal sync signal is low, then the detection data creation unit creates the detection value D according to the following equation:

$$D=2(n+1)$$

with n being the count value of the counter unit.

11. The pixel clock creation method according to claim 8, wherein, when the detecting the state of the high frequency clock at the time of transition of the first horizontal sync signal detects that the state of the high frequency clock at the time of transition of the first horizontal sync signal is high and the detecting the state of the high frequency clock at the time of transition of the second horizontal sync signal detects that the state of the high frequency clock at the time of transition of the second horizontal sync signal is low, then the detection data creation unit creates the detection value D according to the following equation:

$$D=2(n+1)+1$$

with n being the count value of the counter unit.

12. The pixel clock creation method according to claim 8, wherein, when the detecting the state of the high frequency clock at the time of transition of the first horizontal sync signal detects that the state of the high frequency clock at the time of transition of the first horizontal sync signal is low and the detecting the state of the high frequency clock at the time of transition of the second horizontal sync signal detects that the state of the high frequency clock at the time of transition of the second horizontal sync signal is high, then the detection data creation unit creates the detection value D according to the following equation:

$$D=2(n+1)-1$$

with n being the count value of the counter unit.

* * * * *